United States Patent
Savry

(10) Patent No.: US 10,942,868 B2
(45) Date of Patent: Mar. 9, 2021

(54) EXECUTION PROCESS OF BINARY CODE OF FUNCTION SECURED BY MICROPROCESSOR

(71) Applicant: Commissariat a l'energie atomique et aux energies alternatives, Paris (FR)

(72) Inventor: Olivier Savry, Sassenage (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 215 days.

(21) Appl. No.: 16/130,101

(22) Filed: Sep. 13, 2018

(65) Prior Publication Data

US 2019/0095354 A1    Mar. 28, 2019

(30) Foreign Application Priority Data

Sep. 14, 2017    (FR) ...................................... 17 58509

(51) Int. Cl.
*H04L 29/06*    (2006.01)
*G06F 12/14*    (2006.01)
(Continued)

(52) U.S. Cl.
CPC ............ *G06F 12/1408* (2013.01); *G06F 9/24* (2013.01); *G06F 11/1004* (2013.01);
(Continued)

(58) Field of Classification Search
CPC ........ G06F 21/602; G06F 21/72; G06F 21/54; G06F 12/1408; G06F 11/1004; G06F 9/24; H04L 9/004
See application file for complete search history.

(56) References Cited

U.S. PATENT DOCUMENTS

| 5,689,727 A | 11/1997 | Bonke et al. |
| 7,058,877 B2 | 6/2006 | Tremblay et al. |

(Continued)

FOREIGN PATENT DOCUMENTS

| EP | 1 783 648 A1 | 5/2007 |
| EP | 1 855 476 A2 | 11/2007 |

(Continued)

OTHER PUBLICATIONS

French Preliminary Search Report dated Jun. 8, 2018 in French Application 17 58509 filed on Sep. 14, 2017 (with Written Opinion and English Translation of Categories of Cited Documents).

(Continued)

*Primary Examiner* — Joseph P Hirl
*Assistant Examiner* — Chi D Nguy
(74) *Attorney, Agent, or Firm* — Oblon, McClelland, Maier & Neustadt, L.L.P.

(57) ABSTRACT

A method including the loading into registers of a microprocessor of a code line recorded at an address $@_j$, and then calculating, with a securing hardware module, an initialization vector with the aid of a relation $iv_j=F_{j_v}(@_j)$, where $@_j$ is the address from which the code line was loaded, and then decrypting, with the securing hardware module, the code line loaded with the aid of the initialization vector calculated to obtain: a datum $D_j$ of its cryptogram, and a first error-detecting code, and then verifying, with the securing hardware module and with the aid of the first error-detecting code obtained, whether there exists an error in the datum $D_j$ or its cryptogram and, if such an error exists, triggering the signalling of an execution fault and, if such an error does not exist, inhibiting this signalling of an execution fault.

14 Claims, 3 Drawing Sheets

(51) Int. Cl.
- *G06F 21/54* (2013.01)
- *H04L 9/00* (2006.01)
- *G06F 9/24* (2006.01)
- *G06F 11/10* (2006.01)
- *G06F 11/14* (2006.01)
- *G06F 21/60* (2013.01)
- *G06F 21/72* (2013.01)

(52) U.S. Cl.
CPC .......... *G06F 11/1405* (2013.01); *G06F 21/54* (2013.01); *G06F 21/602* (2013.01); *G06F 21/72* (2013.01); *H04L 9/004* (2013.01)

(56) References Cited

U.S. PATENT DOCUMENTS

| | | | |
|---|---|---|---|
| 2003/0046563 A1 | 3/2003 | Ma et al. | |
| 2003/0217325 A1 | 11/2003 | Tremblay et al. | |
| 2004/0260980 A1* | 12/2004 | Ito | G06F 21/14 714/38.1 |
| 2005/0120260 A1* | 6/2005 | Suzuki | H04N 1/0083 714/5.1 |
| 2009/0126029 A1 | 5/2009 | Benoit et al. | |
| 2009/0158045 A1* | 6/2009 | Sun | H04L 9/3242 713/181 |
| 2009/0235090 A1 | 9/2009 | Chang | |
| 2017/0214523 A1 | 7/2017 | Pebay-Peyroula et al. | |

FOREIGN PATENT DOCUMENTS

| | | |
|---|---|---|
| FR | 2 841 015 A1 | 12/2003 |
| FR | 16 50606 | 1/2016 |
| WO | WO 2007/010009 A2 | 1/2007 |
| WO | WO 2012/010205 A1 | 1/2012 |

OTHER PUBLICATIONS

French Preliminary Search Report dated Jun. 11, 2018 in French Application 17 58506 filed on Sep. 14, 2017 (with Written Opinion and English Translation of Categories of Cited Documents).

A Menezes, et al., "Handbook of Applied Cryptography, Chapter 13: Key Management Techniques," CRC Press Series on Discrete Mathematics and Its Applications, 1997 49 Pages.

A. Menezes, et al., "Handbook of Applied Cryptography, Chapter 13: Key Management Protocols," CRC Press Series on Discrete Mathematics and Its Applications, 1997 54 Pages.

* cited by examiner

US 10,942,868 B2

1

EXECUTION PROCESS OF BINARY CODE OF FUNCTION SECURED BY MICROPROCESSOR

The invention relates to a method of execution of a binary code of a secure function by a microprocessor. The invention also relates to:
- a binary code of a secure function, an information recording medium and a microprocessor for the implementation of this method of execution, and
- a compiler for generating this binary code.

To obtain information on a binary code or to cause the binary code to operate in an unexpected manner, numerous attacks are possible. For example, attacks known by the term "fault injection" or "fault attack" can be implemented. These attacks consist in disturbing the functioning of the microprocessor or of the memory containing the binary code, by diverse physical means such as modifications of the supply voltages, modifications of the clock signal, exposure of the microprocessor to electromagnetic waves and others.

With the aid of such attacks, an attacker can alter the integrity of the machine instructions or of the data so as to, for example, retrieve a secret key of a cryptographic system, circumvent security mechanisms such as the verification of a PIN code during an authentication or simply prevent the execution of a function essential to the security of a critical system.

These attacks can in particular cause three types of faults, termed execution faults, during the execution of the binary code:
1) an alteration of the instructions of the executed machine code,
2) an alteration of the data stored in the main memory or in registers of the microprocessor, and
3) an alteration of the machine code control flow.

The control flow corresponds to the execution path followed during the execution of the machine code. The control flow is conventionally represented in the form of a graph known by the term control flow graph.

The binary code of a function can be instrumented to allow the detection and the signalling of execution faults. When the binary code of a function is thus instrumented, this binary code is referred to as "binary code of a secure function". Indeed, in contradistinction to the binary code of a non-secure function, this binary code is able to allow the signalling of execution faults typically encountered in case of attacks.

Prior art is known from:
US2003/046563A1,
U.S. Pat. No. 7,058,877B2,
EP 1783648A1,
FR2841015A1.

In particular, US25003/046563A1 describes a binary code divided into instruction blocks, each encrypted with a different key. In this context, this document teaches that to prevent instruction blocks from being reversed in memory, it is necessary to encrypt each of these blocks with a key which depends on the memory address where this block is recorded. Moreover, this document teaches that after having been decrypted, the integrity of the block is verified. Accordingly, a checksum is calculated for the decrypted block. The expected values of the checksums are recorded in a section of the random-access memory different from that where the encrypted blocks are recorded.

The objective here is to propose a method for executing a binary code of a secure function which offers at least one of the following possibilities:

2

- detecting an execution fault if an instruction of the machine code of the secure function is altered,
- detecting an execution fault if the control flow is altered,
- detecting an execution fault in case of malfunction of an arithmetic and logic unit during the execution of an instruction by this unit,
- detecting an execution fault if the data processed during the execution of the secure function are altered.

The subject of the invention is therefore such a method of execution of a binary code of a secure function by a microprocessor in accordance with Claim 1.

The embodiments of this method of execution can comprise one or more of the characteristics of the dependent claims.

The subject of the invention is also a binary code of a secure function executable by a microprocessor for the implementation of the claimed method.

The subject of the invention is also an information recording medium readable by a microprocessor, this information recording medium containing the claimed binary code.

The subject of the invention is also a microprocessor for the implementation of the claimed method.

Finally, the subject of the invention is also a compiler able to automatically transform a source code of a secure function into a binary code of this secure function, in which the compiler is able to automatically transform the source code into a claimed binary code.

The invention will be better understood on reading the description which follows, given solely by way of nonlimiting example and while referring to the drawings in which.

Figure 1:
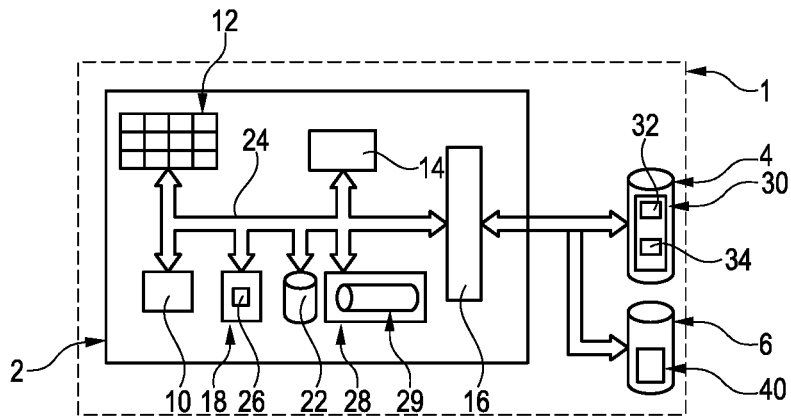
FIG. 1 is a schematic illustration of the architecture of an electronic apparatus able to execute a binary code of a secure function.
Figure 6:
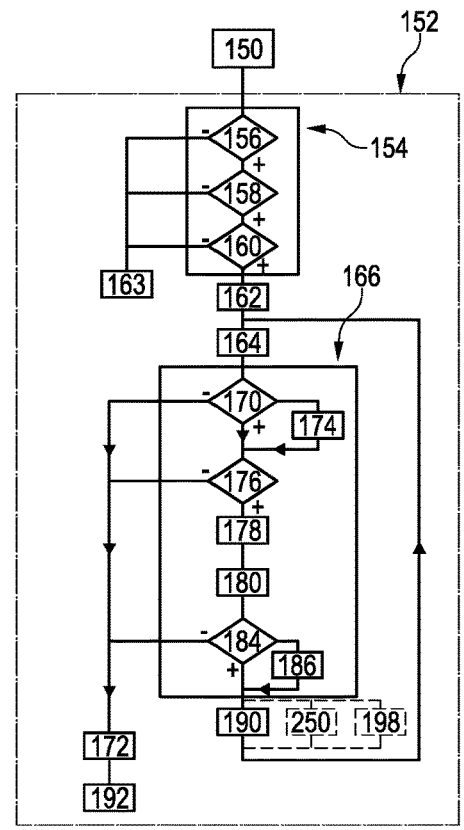
FIG. 6 is a flowchart of a method of execution of the binary code of the secure function.
Figure 7:
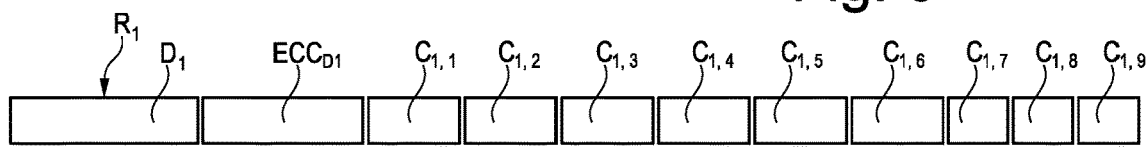
Figure 8:
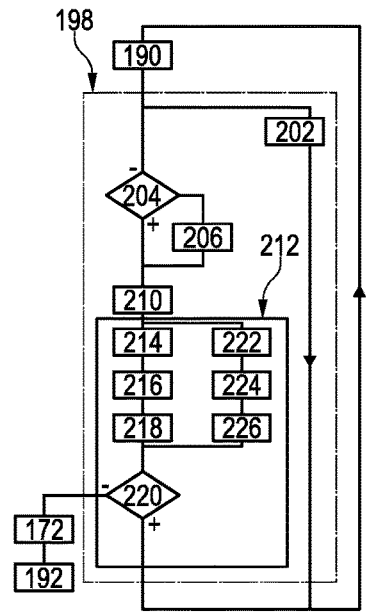
Figure 9:
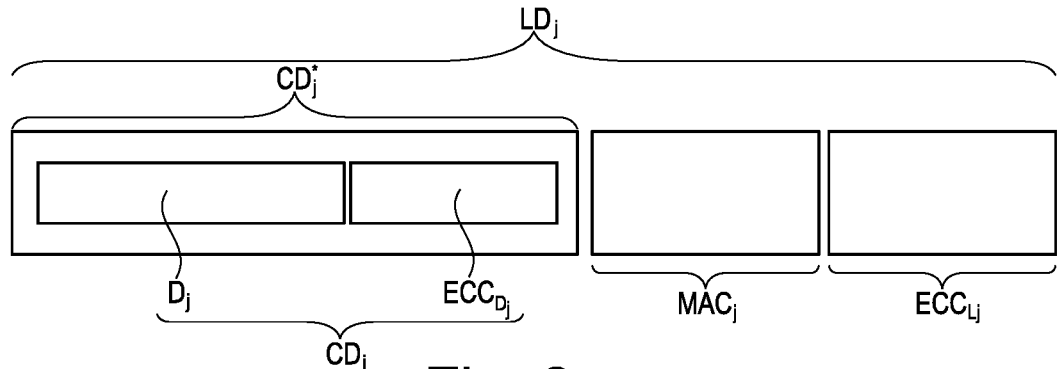
Figure 10:
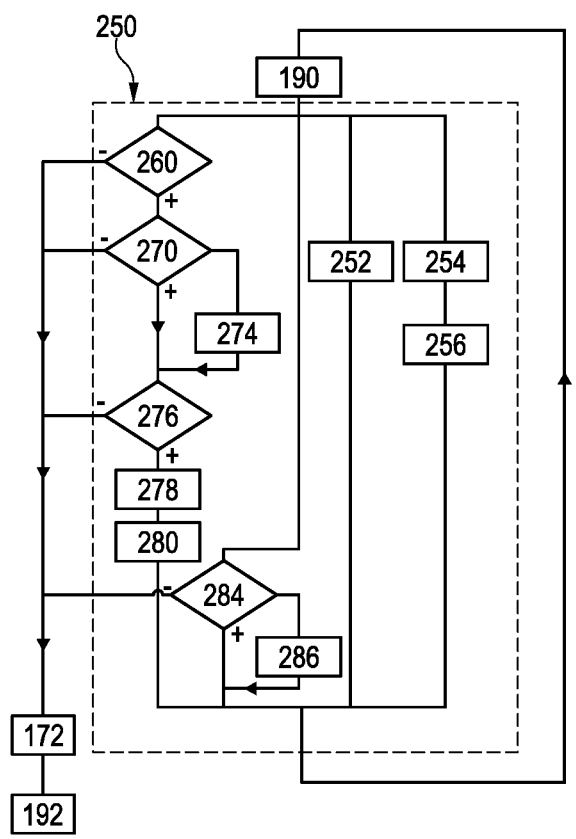
Figure 11:
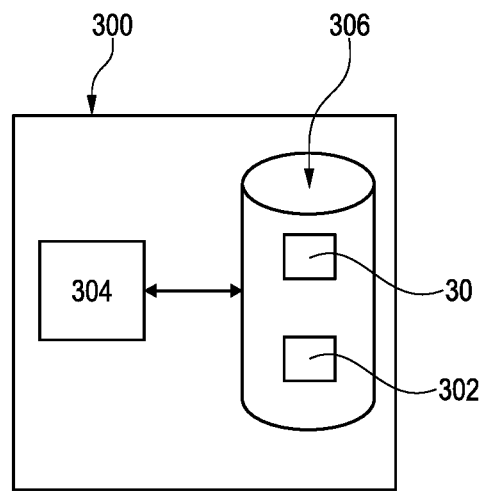

FIG. 7 is a schematic illustration of the structure of a register of the microprocessor of the apparatus of FIG. 1, FIG. 8 is a flowchart of a detail of a step of the method of FIG. 6 implemented to secure the functioning of an arithmetic and logic unit of the microprocessor of the apparatus of FIG. 1, FIG. 9 is a schematic illustration of the structure of a code line coding a datum processed during the execution of the binary code by the apparatus of FIG. 1, FIG. 10 is a flowchart of a detail of a step of the method of FIG. 6 implemented to secure the data processed during the execution of the binary code by the apparatus of FIG. 1, FIG. 11 is a schematic illustration of a compiler able to generate the machine code executed by the apparatus of FIG. 1.

CHAPTER I: CONVENTIONS, NOTATIONS AND DEFINITIONS

In the figures, the same references are used to designate the same elements. Hereinafter in this description, the characteristics and functions that are well known to the person skilled in the art are not described in detail.

In this description, the following definitions are adopted.

A "program" designates a set of one or more predetermined functions that one wishes to be executed by a microprocessor.

A "source code" is a representation of the program in a computer language, not being directly executable by a microprocessor and being intended to be transformed by a compiler into a machine code directly executable by the microprocessor.

A program or a code is said to be "directly executable" when it is able to be executed by a microprocessor without any prior need for this microprocessor to compile it by means of a compiler or to interpret it by means of an interpreter.

An "instruction" designates a machine instruction executable by a microprocessor. Such an instruction consists:
  of an opcode, or operation code, coding the nature of the operation to be executed, and
  of one or more operands defining the value or values of the parameters f this operation.

A "machine code" is a set of machine instructions. It typically entails a file containing a succession of bits bearing the value "0" or "1", these bits coding the instructions to be executed by the microprocessor. The machine code is directly executable by the microprocessor, that is to say without requiring prior compilation or interpretation.

A "binary code" is a file containing a succession, of bits bearing the value "0" or "1". These bits code data and instructions to be executed by the microprocessor. Thus, the binary code comprises at least one machine code and in addition, generally, digital data processed by this machine code.

A "flow of instructions" is a succession of instructions ranked one after another and which forms, in the machine code, an ordered string of bits. The flow of instructions starts with an initial instruction and terminates with a final instruction. With respect to a given instruction of the flow of instructions, the instructions situated on the side of the initial instruction are called "preceding instructions" and the instructions situated on the side of the final instruction are called "following instructions". In this text, this flow of instructions in memory is split up into a succession of base blocks that are immediately consecutive or are separated by data blocks.

In this text, a "base block" is a group of successive instructions of the flow of instructions which starts at a branching address and which terminates with a single explicit or implicit branching instruction. An explicit branching instruction is characterized by the explicit presence of an opcode in the machine code which codes the branching instruction. An implicit branching instruction corresponds to the case where the execution of a preceding base block continues systematically via the execution of a following base block situated, in the machine code, immediately after the preceding base block. In this case, given that in the absence of any explicit branching instruction, the instructions of the machine code are executed in order one after another, it is not necessary to introduce at the end of the preceding base block an explicit instruction for branching to the following base block. In this description, it is said that in this case, the preceding base block terminates with an implicit branching instruction since it is not explicitly coded in the machine code. In this case, the preceding base block terminates just before the branching address of the following base block. In this patent application, the expression "branching instruction" designates an explicit branching instruction unless stated to the contrary. Thus, the execution of a base block starts systematically with the execution of the instruction situated at its branching address and terminates systematically with the execution of the branching instruction which terminates this base block. A base block does not comprise any branching instructions other than that situated at the end of this base block. Thus, the instructions of a base block are systematically all read by the microprocessor one after another in the order in which they are present in this base block. The branching instruction can direct, when it is executed, the control flow systematically to the same branching address or, alternately, to various branching addresses. The latter typical case is encountered, for example, when at the end of the base block executed, the control flow can continue towards a first and, alternately, towards a second base block.

A "branching instruction" is an instruction which, when it is executed by the microprocessor, triggers a jump to, the branching address of another base block. This branching instruction therefore comprises at least the branching address of this other base block. Typically, for this purpose, this instruction replaces the current value of the ordinal counter by the value of the branching address. It is recalled that the ordinal counter contains the address of the next instruction to be executed by the microprocessor. In the absence of any branching instruction, each time an instruction is executed, the ordinal counter is incremented by the size of the currently executed instruction. In the absence of any branching instruction, the instructions are systematically executed sequentially one after another in the order in which they are recorded in a main memory. The branching instruction can be unconditional, that is to say that the jump to the branching address is systematically carried out as soon as this instruction is executed. An unconditional branching instruction is for example the "JMP" instruction in assembler language for the microprocessors of the x86 series. The branching instruction can also be conditional, that is to say that the jump to the branching address is triggered during its execution only if a particular condition is satisfied. For example, a conditional branching instruction is a "JE" "JA" or "JNE" instruction in assembler. The branching instruction can equally well be a call to a function. In this text, the term "branching instruction" designates equally well direct and indirect branching instructions. A direct branching instruction is a branching instruction which directly contains the numerical value of the branching address. An indirect branching instruction is an instruction for branching to a branching address contained in a memory or a register of the microprocessor. Thus, in contradistinction to a direct branching instruction, an indirect branching instruction does not directly contain the numerical value of the branching address.

A "branching address" is the address in the main memory at which the first executed instruction of a base block is situated. Hereinafter, one speaks of branching address even for the base blocks whose first instruction is executed subsequent to the execution of an implicit branching instruction.

One speaks of execution of a function to designate the execution of the instructions carrying out this function.

For the sake of simplification, in this description and in the figures, the instructions are not represented in binary form, but rather in a symbolic form expressed in a higher level advanced language.

CHAPTER II: ARCHITECTURE OF THE APPARATUS

FIG. 1 represents an electronic apparatus 1 comprising a microprocessor 2, a main memory 4 and a mass storage medium 6. For example, the apparatus 1 is a computer, a smartphone, an electronic tablet or the like.

The microprocessor 2 comprises here:
- an arithmetic and logic unit 10;
- a set 12 of registers;
- a control module 14;
- a data input/output interface 16,
- a loader 18 of instructions comprising an ordinal counter 26,
- a queue 22 of instructions to be executed, and
- a securing hardware module 28.

The memory 4 is configured to store instructions of a binary code 30 of a program having to be executed by the microprocessor 2. The memory 4 is a random access memory. Typically, the memory 4 is a volatile memory. The memory 4 can be a memory external to the microprocessor 2 as represented in FIG. 1. In this case, the memory 4 is embodied on a substrate mechanically separate from the substrate on which the various elements of the microprocessor 2, such as the unit 10, are embodied.

Here, the memory 4 is divided into successive machine words of fixed length. Each machine word can be transferred in a single dock cycle from the memory 4 into a register of the microprocessor. For this purpose, the size $N_{MM}$ of a machine word is equal to the maximum number of bits which can be transferred simultaneously from the memory 4 to a register of the set 12. Here, the size $N_{MM}$ is strictly greater than $N_{jnst}$ bits, where $N_{jnst}$ bits is the number of bits of the instructions of the instruction set of the microprocessor 2. Typically, $N_{jnst}$ is an integer greater than or equal to 8, 16, 32 or 64. In this example, $N_{jnst}$ is equal to 32 and the size $N_{MM}$ is equal to 128 bits.

By way of illustration, the binary code 30 comprises in particular a machine code 32 of a secure function and a block 34 of data necessary for the decryption of the binary code 30. Each secure function corresponds to a set of several code lines, for example several hundreds or thousands of code lines, recorded at successive addresses in the memory 4. Here, each code line corresponds to a machine word. Thus, a code line is loaded into a register of the microprocessor 12 in a single reading operation. Likewise, a code line is written into the memory 4 by the microprocessor 2 in a single writing operation. Each code line codes either a single instruction or a single datum. The structure of a code line of the secure functions is described in detail with reference to FIGS. 2 and 9.

The block 34 is typically situated in a predetermined range of addresses at the start of the binary code 30. Thus, the execution of the binary code 30 starts with the loading and the processing of the data of the block 34. Here, the block 34 comprises in particular:
- a cryptogram ka* obtained by encrypting a key ka with the aid of a public key $pk_{CPU}$ of the microprocessor 2,
- the cryptogram $iv_{jni}$* obtained by encrypting, with the aid of the public key $pk_{CPU}$, an initialization vector $iv_{jni}$ used, to encrypt the first base block with which the execution of the machine code 32 starts systematically,
- a signature $S_{ka*}$, of the cryptogram ka*, obtained by encrypting a label, constructed on the basis of the cryptogram ka*, with the aid of a private key $sk_{aut}$ of an author of the binary code 30,
- a cryptographic certificate $C_{aut}$ which makes it possible to verify the signature $S_{ka*}$, this certificate being signed with the aid of a private key $sk_{os}$ of an operating system and containing a public key $pk_{aut}$ which makes it possible to verify the authenticity of the signature $S_{ka*}$.

The label of the cryptogram ka* is typically obtained by applying a predetermined hash function to the cryptogram ka*. Such a label is better known by the term "digest".

By way of illustration, the microprocessor 2 complies with the RISC ("Reduced Instructions Set Computer") architecture.

Here, the unit 10 is an arithmetic and logic unit of $N_{jnst}$ bits.

The loader 18 loads into the queue 22 the next instruction to be executed by the unit 10 from the memory 4. More precisely, the loader 18 loads the instruction pointed at by the ordinal counter 26. In this embodiment, the loader 18 loads an instruction $I_j$ and an error-correcting code $ECC_{Ij}$ into the queue 22 systematically and each time. The code $ECC_{Ij}$ is coded on $N_{ECCIj}$ bits, where $N_{ECCIj}$ is an integer number often strictly less than $N_{jnst}$ and, generally, greater than 1 or 2 or 3 bits. For this purpose, the queue 22 comprises a succession of several registers each of width equal to $N_{ECCIj}+N_{jnst}$ bits.

The unit 10 is in particular configured to execute one after another the instructions loaded into the queue 22. The instructions loaded into the queue 22 are generally executed systematically in the order in which these instructions were recorded in this queue 22. The unit 10 is also capable of recording the result of these instructions executed in one or more of the registers of the set 12.

In this description, "execution by the microprocessor 2" and "execution by the unit 10" will be used as synonyms.

The module 14 is configured to move data between the set 12 of registers and the interface 16. The interface 16 is in particular able to acquire data and instructions, for example, from the external memory 4 and/or the medium 6 external to the microprocessor 2.

The module 28 is capable of automatically executing the various operations described in detail in the following chapters so as to secure the execution of the secure functions. The module 28 operates independently and without using the unit 10. Thus, it is capable of processing the code lines before and/or after the latter are processed by the unit 10. For this purpose, it comprises in particular a secure non-volatile memory 29. There is no provision for access to this memory 29 without passing by way of, the module 28. In this embodiment, the module 28 is preprogrammed, for example during its design, to execute operations such as the following operations:
- verifying an error-correcting code and correcting the error on the basis of this code if necessary,
- verifying an error-detecting code,
- constructing an error-detecting or -correcting code on the basis of a datum,
- verifying the integrity and the authenticity of a datum on the basis of a message authentication code better known by the acronym MAC ("Message Authentication Code"),
- encrypting a datum to obtain a cryptogram,
- decrypting a cryptogram to obtain a plaintext datum,
- verifying a cryptographic signature and/or a cryptographic certificate,
- executing a preprogrammed function $F_{jv}$.

The memory 29 is used to store the secret information necessary for the implementation of the method of FIG. 6. Here, said memory therefore comprises, in particular, secret information prerecorded before the start of the execution of the binary code 30. In particular, it comprises the following prerecorded information:
- a secret key k' used for the verifications of the message authentication codes, a cryptographic certificate $C_{os}$ issued by a trusted authority and comprising a public key $pk_{os}$ of this trusted authority, a cryptographic certificate $C_{CPU}$ which is signed by the trusted authority with the aid of a private key $sk_{os}$ which makes it possible to encrypt data which must be decrypted with the aid of the public key $pk_{OS}$, this certificate containing a public key $pk_{CPU}$, a secret private key $sk_{CPU}$ which makes it possible to decrypt the data which have been encrypted with the aid of the public key $pk_{CPU}$.

In this exemplary embodiment, the set 12 comprises general registers usable to store any type of data. The size of each of these registers is, for example, equal to $N_{MM}$.

A data exchange bus 24 which inter-links the various components of the microprocessor 2 is represented in FIG. 1 to indicate that the various components of the microprocessor can exchange data between themselves.

The medium 6 is typically a nonvolatile memory. For example, it is a memory of the EEPROM or Flash type. It contains here a backup copy 40 of the binary code 30. Typically, it is this copy 40 which is automatically copied over into the memory 4 to restore the code 30, for example, after a current outage or the like or just before the start of execution of the code 30.

CHAPTER III: SECURING OF THE MACHINE CODE

Here, the structure of the machine code of the secure function is described in the particular case of the machine code 32. However, what is described in this particular case carries over without difficulty to any machine code of a secure function.

The machine code 32 comprises a succession of code lines $LI_j$ recorded one after another in the memory 4. Hereinafter, in this chapter, the index j is used to identify the code line $LI_j$ from among the other code lines of the machine code 32. Moreover, the index j is also used as a serial number indicating the order in which the lines $LI_j$ are ranked. Thus, the code line situated immediately after the line $LI_j$ is denoted $LI_{j+1}$. Each code line $LI_j$ codes an instruction of the instruction set of the microprocessor 2, able to be executed after having been decrypted and decoded by the unit 10 of this microprocessor.

The structure of all the lines $LI_j$ is identical. It is represented in detail in FIG. 2 in the particular case of the line $LI_j$. The line $LI_j$ comprises a cryptogram $CI_j^*$, a code $MAC_j$, and a code $ECC_{Lj}$.

The cryptogram $CI_j^*$ is obtained by encrypting a concatenation $CI_j$ with the aid of the secret key ka and of an initialization vector $iv_k$. More precisely, the cryptogram $CI_j^*$ is obtained with the aid of the following relation: $CI_j^* = f_{ka}(CI_j; iv_k)$, where $f_{ka}$ is an encryption function corresponding to a decryption function $f_{ka}^{-1}$ preprogrammed into the module 28. Typically, the function $f_{ka}$ is a symmetric encryption function. Henceforth, the key ka making it possible to decrypt the cryptogram $CI_j^*$ is prerecorded in the memory 29 so as to allow the module 28 to decrypt this cryptogram $CI_j^*$. As explained further on, the initialization vector $iv_k$ is for its part contained in a preceding code line of the machine code 32.

The concatenation $CI_j$ is here the concatenation of an instruction $I_j$ to be executed by the microprocessor 2 and of a code $ECC_{Ij}$. The code $ECC_{Ij}$ makes it possible to detect an error in the instruction $I_j$ and to correct this error. For example, the code $ECC_{Ij}$ may be the code known by the acronym BCH (Bose, Ray-Chaudhuri, Hocquenghem) which exhibits the advantage of being particularly easy to implement. However, any other known error-correcting code may be implemented. The size of the code $ECC_{Ij}$ is greater than or equal to 1 or 2 or 3 bits and, generally, less than $N_{jnst}$. The size of the code $ECC_{Ij}$ is determined as a function of the desired robustness. The more it is desired to be capable of correcting a significant number of erroneous bits in the instruction $I_j$, the larger will be the size of the code $ECC_{Ij}$.

The code $MAC_j$ is a code making it possible to verify the integrity and the authenticity of the cryptogram $CI_j^*$. This code is commonly called a "message authentication code" and known by the acronym MAC. Such a code $MAC_j$ is obtained by constructing a label on the basis of the cryptogram $CI_j^*$ which normally comprises fewer bits than the cryptogram $CI_j^*$. This label is constructed with the aid of a predetermined function such as a hash function. Thereafter, this label is encrypted with the secret key k' known only to the author of the binary code 30 and the microprocessor 2. Here, the key k' is prerecorded in the memory 29.

By way of example, to generate the cryptogram $CI_j^*$ and the code $MAC_j$, an authenticated flow-based encryption algorithm is used. This authenticated flow-based encryption algorithm can be chosen from among the various candidates in the CAESAR competition ("Competition for Authenticated Encryption: Security, Applicability, and Robustness") such as for example one of the algorithms designated by the following names: "ACORN", "ASCON", "SILC", "CLOC", "JAMBU", "KETJE".

The code $ECC_{Lj}$ is an error-correcting code which makes it possible to detect and to correct an error in the cryptogram $CI_j^*$ and the code $MAC_j$. It is for example constructed as described in the case of the code $ECC_{Ij}$.

Hereinafter, the address in the memory 4 at which the line $LI_j$ is recorded is denoted @.

The machine code 32 is composed of a succession of base blocks which must be executed one after another. Here, each base block is composed of a succession of code lines which each comprises the cryptogram $CI_j^*$ of the instruction $I_j$ to be executed.

Figure 3:
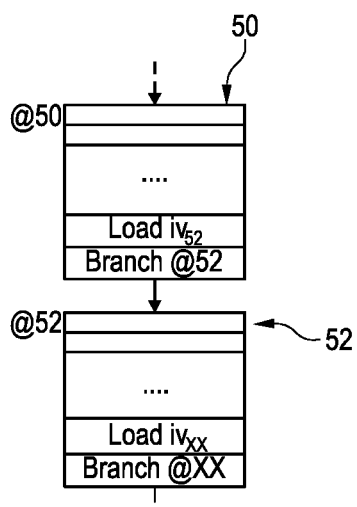

FIG. 3 represents a first arrangement of two base blocks 50 and 52 of the machine code 32. In this first arrangement, the base blocks 50 and 52 are systematically executed one after the other. In the order of execution, the base block 50 precedes the base block 52. In this figure and the following figures:

the order of execution of the base blocks is represented by an arrow which points from the preceding base block to the following base block, a dashed arrow which points at a represented base block indicates that the base block or blocks which precede this base block have not been represented so as to simplify the figure, a dashed arrow which points in vacuo from a represented base block indicates that the base block or blocks following this represented base block have not been represented so as to simplify the figure, the symbol " . . . " inside a base block indicates that not all the code lines of this base block have been represented.

Figure 2:
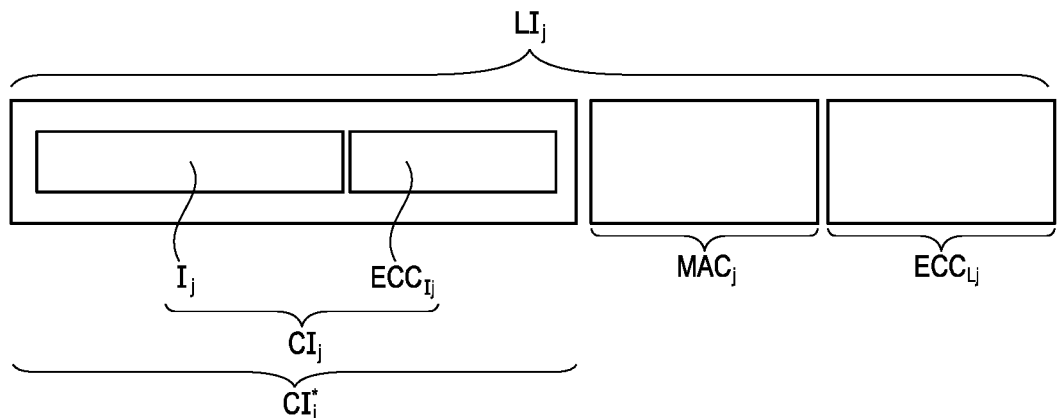
FIG. 2 is a schematic illustration of the structure of a code line coding an instruction of the binary code executed by the apparatus of FIG. 1, FIGS. 3 to 5 are schematic illustrations of various portions of the binary code of the secure function which is executable by the apparatus of FIG. 1.

Each base block starts with a branching address and terminates with a code line which contains the cryptogram of a branching instruction. In FIG. 2, the symbols "@50" and "@52" alongside the first code line of each base block designate the branching addresses, respectively, of the base blocks 50 and 52. The symbol "@XX" designates the branching address of another base block not represented in FIG. 2.

The symbol "Load $iv_{XX}$" indicated in the last-but-one code line of the base block indicates that this code line comprises the cryptogram of an instruction which, when it is executed by the microprocessor 2, causes the loading of a new initialization vector $iv_{XX}$ into the memory 29. Thus, the symbol "Load $iv_{52}$" indicates that the initialization vector $iv_{52}$ is loaded into the memory 29 before the start of execution of the base block 52.

The symbol "Branch @XX" indicated inside the last code line of the base block indicates that this last line comprises the cryptogram of an instruction which, when it is executed by the microprocessor 2, causes an unconditional branching to the branching address @XX.

Here, the same initialization vector $iv_k$ is used to decrypt all the cryptograms $CI_j^*$ of all the code lines of the same base block $BB_k$. The index k identifies without ambiguity the base block $BB_k$ from among the set of base blocks of the machine code 32. In the figures and in the description, the symbol $iv_k$ is hereinafter used to designate in a general manner the initialization vector to be used to decrypt the base block $BB_k$. Moreover, in the simple cases such as that represented in FIG. 3 where two base blocks follow one another in the order of execution of the machine code 32, the index k is also used to indicate the order in which these base blocks are executed. For example, the notation $BB_{k-1}$ is, in these simple cases, used to designate the base block systematically executed immediately before the base block $BB_k$.

Here, the initialization vector $iv_k$ is unique for each base block $BB_k$. By "unique for each base block" is meant the fact that the probability that two different base blocks of the machine code 32 are encrypted with the same initialization vector $iv_k$ is less than one chance in 100 or in 1000. In particular, the expression "unique for each base block" therefore covers the case where the initialization vectors $iv_k$ of all the base blocks are systematically different from one another. For example, in a simple embodiment, during the generation of the code 32, the initialization vectors $iv_k$ of each base block are drawn in a random or pseudo-random manner from the set $(1; \ldots ; 2^{Ninst})$.

As represented in FIG. 3, in the code 32, the initialization vector $iv_k$ is loaded into the memory 29 solely during the execution of a base block preceding the base block $BB_k$. In FIG. 3, the initialization vector $iv_{52}$ necessary for decrypting the block 52 is loaded during the execution of the block 50.

Figure 4:
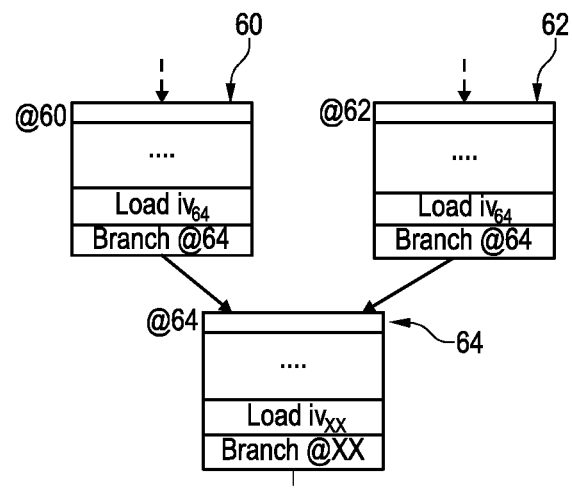

FIG. 4 represents another possible arrangement of several base blocks of the code 32 in the particular case of two preceding base blocks 60 and 62 and of a following base block 64. Here, the blocks 60 and 64 are, for example, identical, respectively, to the blocks 50 and 52 except that the initialization vector for the block 64 is denoted "$iv_{64}$". The block 62 is constructed like the block 60 and, in particular, it terminates with two code lines which code the same instructions as those coded in the last two lines of the block 60. However, even though these last two lines code the same instructions, the cryptograms of these instructions are different because the block 62 is encrypted using a different initialization vector $iv_{62}$ from the vector $iv_{60}$ used to encrypt the block 60. The other code lines of the block 62 are different from those of the block 60.

Figure 5:
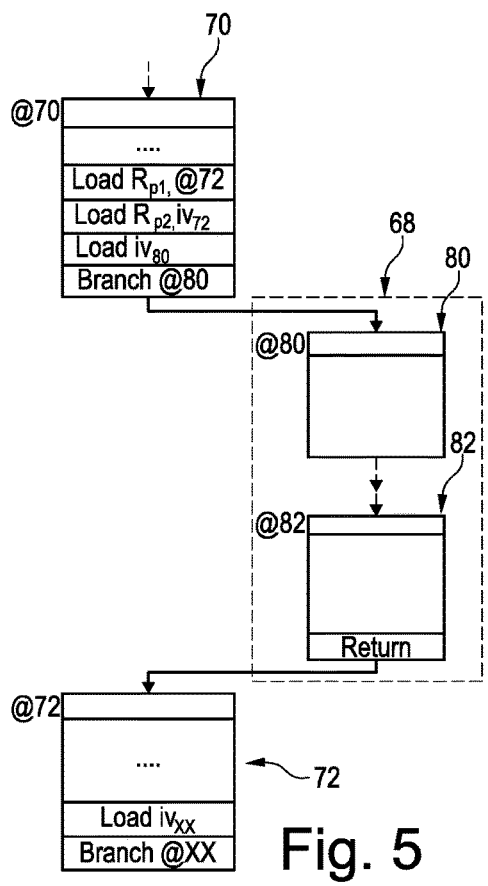

FIG. 5 represents a part of the architecture of the machine code 32 when a base block terminates with a call to a machine code 68 of a secure sub-function. The machine code 68 is arranged as previously described for the machine code 32. It is therefore composed of a succession of base blocks. To simplify FIG. 5, only the first base block 80 and the last base block 82 of this machine code 68 have been represented.

The machine code 68 can be called from various base blocks of the machine code 32 and, when the execution of the machine code 68 has terminated, the flow of instructions can return to various base blocks of the machine code 32. Thus, the base block which must be executed after the base block 82 depends on the base block which called the machine code 68. Consequently, in contradistinction to what was described with reference to FIGS. 3 and 4, the base block 80 does not terminate with a code line which codes an instruction for branching systematically to the same address but with a code line which codes a "Return" instruction. Consequently, in FIG. 5, the "Return" symbol is used to identify the last line of the block 82.

In contradistinction to the "Branch" instruction described previously, the "Return" instruction does not explicitly comprise the address of the next base block to be executed. Nor is the "Return" instruction preceded by an instruction for loading an initialization vector to be used to decrypt the next base block to be executed.

Here, when the "Return" instruction is executed by the microprocessor 2, it causes:
  the loading of a new initialization vector contained in a register $R_{p2}$ of the microprocessor, and then
  an unconditional jump to an address contained in a register $R_{p1}$ of the microprocessor 2.

These registers $R_{p1}$ and $R_{p2}$ are loaded with the appropriate values during the execution of the base block from which the machine code 68 is called. For example, in FIG. 5, the machine code 68 is called from a base block 70 and, after the execution of the machine code 68, the execution of the machine code 32 must continue with the execution of a base block 72. The base block 70 terminates with two lines coding respectively, the loading of the initialization vector $iv_{80}$ into the memory 29 and an unconditional jump to the address @80 of the base block 80 of the machine code 68.

Moreover, before these lines, the block 70 also comprises:
  a line which codes an instruction for loading into the register $R_{p1}$ the address @72 of the base block 72, and
  a line which codes an instruction for loading into the register $R_{p2}$ the initialization vector $iv_{72}$ necessary to decrypt the base block 72.

In FIG. 5, these lines are designated by the symbols, respectively "Load $R_{p1}$, @72" and "Load $R_{p2}$, $iv_{72}$".

Thus, during the execution of the "Return" instruction, the next base block executed will be the base block 72 and the initialization vector used to decrypt it will be the vector $iv_{72}$ loaded into the register $R_{p2}$.

Preferably, the registers $R_{p3}$ and $R_{p2}$ are registers of a call stack so as to allow calls to sub-functions from the base blocks of other sub-functions.

FIG. 6 represents a method of execution of the binary code 30 by the microprocessor 2.

The method starts with a step 150 of providing the binary code 30 in the memory 4. Accordingly, for example, the microprocessor 2 copies over the copy 40 inside the memory 4 to obtain the binary code 30 recorded in the memory 4.

Thereafter, during a phase 152, the microprocessor 2 executes the binary code 30 and, in particular, the machine code 32.

The execution of the binary code 30 begins with a step 154 of authenticating the author of this binary code. During this step, the module 28 carries out successively the following operations:

during an operation 156, the module 28 verifies the authenticity of the certificate $C_{CPU}$ with the aid of the public key $pk_{OS}$ contained in the certificate $C_{OS}$.

during an operation 158, the module 28 loads the certificate $C_{AUT}$ from the block 34 and then verifies its authenticity with the aid of the public key $pk_{OS}$ contained in the certificate $C_{OS}$.

during an operation 160, the module 28 loads the signature $S_{ka^*}$ from the block 34 and verifies its authenticity with the aid of the key $pk_{AUT}$ contained in the certificate $C_{AUT}$.

If all the verification operations 156, 158 and 160 have been accomplished successfully, then the binary code is correctly authenticated and the method continues via a step 162. Conversely, if one of the operations 156, 158 or 160 has not been accomplished successfully, the module 28 then considers that the authentication of the author of the binary code 30 has failed and the method continues via a step 163. During step 163, the execution of the binary code 30 is stopped.

During step 162, the module 28 loads the cryptograms ka* and $iv_{jmi}$* contained in the block 34 and decrypts them with the aid of the key $sk_{CPU}$ contained in the memory 29. On completion of step 162, the key ka and the initialization vector $iv_{jmi}$ used to decrypt the first base block of the machine code 32 are contained in the memory 29.

After step 162, the microprocessor 2 executes, one after another, the base blocks, beginning with the first base block $BB_{jmi}$ of the machine code 32.

The execution of each base block consists in executing, in the order in which the code lines $LI_j$ of this base block are recorded in the memory 4, the instructions coded by each of these code lines.

For each of the code lines $LI_j$ to be executed of the machine code 32, the microprocessor 2 executes the following steps.

During a step 164, the microprocessor 2 loads into a register of the set 12, the code line recorded at the address $@_j$ contained in the ordinal counter 26.

Thereafter, the module 28 undertakes a step 166 of securing the instruction coded in the loaded code line.

The manner in which step 166 functions is now described in the case of the line $LI_j$. More precisely, during step 166, the module 28 carries out successively the following operations.

During an operation 170, the module 28 verifies whether there exists an error in the cryptogram $CI_j$* or the code $MAC_j$ with the aid of the code $ECC_{Lj}$ contained in the line $LI_j$ loaded. For example, accordingly, the module 28 constructs, with the aid of a preprogrammed function and of the cryptogram $CI_j$* and of the code $MAC_j$, a code $ECC_{Lj}$'. If the code $ECC_{Lj}$' is different from the code $ECC_{Lj}$, then an error is detected. If an error is detected, the module 28 immediately undertakes a step 172.

During step 172, the module 28 triggers the signalling of an execution fault.

Here, in parallel with step 172, if an error is detected, the module 28 undertakes an operation 174. During the operation 174, it corrects the cryptogram $CI_j$* and the code $MAC_j$ on the basis of the information contained in the code $ECC_{Lj}$. On completion of step 174, the corrected cryptogram $CI_j$* and the corrected code $MAC_j$ are used in place, respectively, of the cryptogram $CI_j$* and of the code $MAC_j$ which are contained in the line $LI_j$.

The operation 170 makes it possible in particular to detect and to correct faults introduced into the code lines stored in the memory 4 or in the medium 6.

On completion of the operation 174 or if no error was detected during the operation 170, the method continues via an operation 176.

During the operation 176, the module 28 verifies the integrity and authenticity of the cryptogram $CI_j$* with the aid of the code $MAC_j$. For example, accordingly, the module 28 constructs a label of the cryptogram $CI_j$* and then encrypts this label with the key k' contained in its memory 29. If the cryptogram thus constructed is identical to the code $MAC_j$ loaded, then the integrity and the authenticity of the cryptogram $CI_j$* is confirmed. In this case, the module 28 undertakes an operation 178. In the converse case, the module 28 undertakes step 172.

The operation 176 makes it possible on the one hand to validate the authenticity of the loaded code line and also to validate that, during the operation 174, the cryptogram $CI_j$* and/or the code $MAC_j$ have correctly been corrected. The verification of the authenticity prevents the replacement of the code line by another code line constructed by an author who does not know the key k'.

During the operation 178, the module 28 decrypts the cryptogram $CI_j$* by using the key ka and the initialization vector $iv_k$ to obtain the decrypted instruction $I_j$ and the decrypted code $ECC_{Ij}$. The key ka was recorded in the memory 29 during step 162. The vector $iv_k$ necessary to decrypt the cryptogram $CI_j$* was recorded in the memory 29 during the execution of the base block preceding that which contains this currently processed line $LI_j$. If the line $LI_j$ is contained in the first base block $BB_{jmi}$ of the machine code 32, it is the vector $iv_{jmi}$ recorded in the memory 29 during step 162 which is used.

Here, it is the execution of the branching instruction by the unit 10 which indicates to the module 28 that it must replace the initialization vector currently used by the initialization vector loaded during the execution of the preceding base block.

Thereafter, during an operation 180, the module 28 records the decrypted instruction $I_j$ and the decrypted code $ECC_{Ij}$ in the queue 22.

Once the unit 10 has executed all the instructions which precede the instruction $I_j$ in the queue 22, that is to say when the instruction $I_j$ is the next instruction to be executed by the unit 10, the module 28 undertakes an operation 184.

During the operation 184, the module 28 verifies whether there exists an error in the instruction $I_j$ contained in the queue 22 with the aid of the code $ECC_{Ij}$ associated with the instruction $I_j$ and contained in this same queue 22. This operation is carried out in a similar manner to what was described for the operation 170.

If the module 28 detects an error, then it immediately undertakes step 172. Moreover, in parallel, during an operation 186, the module 28 corrects the instruction $I_j$ with the aid of the code $ECC_{Ij}$. The operation 186 is similar to the operation 174.

Thereafter, on completion of the operation 186 or if no error was detected during the operation 184, step 166 terminates and the method continues via a step 190 of executing the instruction $I_j$ by the unit 10.

As represented in FIG. 6, in parallel with step 190, the method can comprise:

a step 198 of securing the unit 10, and/or a step 250 of securing the processed data.

These steps 198 and 250 are described in greater detail in the following chapters.

The operation 184 makes it possible to detect a modification of the instruction $I_j$ which would occur between the instant at which it is recorded in the queue 22 and the instant at which it is executed by the unit 10. The operation 184 makes it possible also to trigger an execution fault if the machine code 32 control flow has been modified. Indeed, a modification of the control flow was manifested by the fact that after the execution of the base block $BB_{k-1}$ it is not the base block $BB_k$ which is executed but another base block $BB_t$. In this case, during the execution of the block $BB_{k-1}$, the initialization vector $v_{k-1}$ is loaded into the memory 29. Henceforth, during the execution of the block $BB_t$, the cryptogram $CI_j^*$ is decrypted with the aid of the vector $iv_k$ which corresponds to the block $BB_k$ and not with the aid of the vector $iv_t$ which corresponds to the block $BB_t$. Consequently, the decryption of the cryptogram $CI_j^*$ with the aid of the vector $iv_k$ leads to the obtaining of an incorrect instruction $I_j$ and of an incorrect code $ECC_{Ij}$, this being detected during the operation 184.

In a similar manner, the operation 184 makes it, possible also to detect a disturbance of the execution of the "Return" operation of the base block 82.

During the execution of the machine code 32, if attacks lead to an alteration of an instruction to be protected or a modification of the control flow, the microprocessor 2 signals, during step 172, a fault in the execution of the machine code 32. In response to such a signalling, during a step 192, the microprocessor 2 implements one or more counter-measures. Very numerous counter-measures are possible. The counter-measures implemented can have very different degrees of severity. For example, the counter-measures implemented can go from simple display or simple storage of an error message without interrupting the normal execution of the machine code 32 up to definitive shutdown of the microprocessor 2. The microprocessor 2 is considered to be shut down when it is definitively placed in a state where it is incapable of executing any machine code. Between these extreme degrees of severity, there exist numerous other possible counter-measures such as:
 the indication by way of a man-machine interface of the detection of faults,
 the immediate interruption of the execution of the machine code 32 and/or its reinitialization, and
 the deletion of the machine code 32 from the memory 4 and/or the deletion of the backup copy 40 and/or the deletion of the secret data.

Moreover, here, the counter-measure implemented during step 192 can be selected as a function of the error detected and therefore as a function of the operation which led to the detection of this fault. For example, the counter-measure selected will not be the same depending on whether the error was detected during the operation 170, 176 or 184.

CHAPTER IV: SECURING OF THE ARITHMETIC AND LOGIC UNIT 10

In this chapter, by "arithmetic and logic instruction" is meant an instruction of the instruction set of the microprocessor 2 which, when it is executed by this microprocessor, records in a register $R_{res}$ of the microprocessor a datum obtained:
 either by modifying the bits of a single datum $D_1$ recorded in a register of the microprocessor, or,
 else by combining together the bits of several data $D_1$ to $D_n$ recorded, respectively, in registers $R_1$ to $R_n$ of the microprocessor 2, where n is an integer equal to the number of data to be combined.

Conventionally, n is equal to two in the case where several data must be combined. n equal to one corresponds to the case where the arithmetic and logic instruction modifies the bits of a single datum $D_1$.

The registers in which the datum or data to be processed are recorded are typically identified by one or more operands of the arithmetic and logic instruction. Likewise, the register $R_{res}$ in which the result $D_{res-p}$ of the arithmetic and logic instruction must be recorded can also be identified by an operand of this arithmetic and logic instruction.

The opcode of the arithmetic and logic instruction identifies the operation to be executed by the unit 10 so as to modify or combine the datum or data $D_1$ to $D_n$. Hereinafter, the symbol "*" is used to designate this operation in a generic manner. Thus, the notation $D_1*D_2* \ldots *D_n$ designates in a generic manner the operation executed by the arithmetic and logic instruction when it is executed by the microprocessor 2.

In the case where n is equal to one, the arithmetic and logic operation is for example chosen from the group consisting:
 of the operations of right and left shifting of the bits of the datum $D_1$, and
 of the operations of extracting a predefined range of bits of the datum $D_1$.

In the case where n is greater than or equal to two, the operation "*" is chosen from the group consisting of the following operations:
 the arithmetical addition operation,
 the arithmetical subtraction operation,
 the arithmetical multiplication operation,
 the arithmetical division operation,
 the logical "OR" operation,
 the logical "exclusive OR" operation,
 the logical "AND" operation.

By injecting faults while the unit 10 is functioning, it is possible to disturb its functioning so that the result of the execution of the arithmetic and logic instruction does not correspond to that expected. One is then said to have caused a malfunction of the unit 10.

This chapter describes a solution for detecting such a malfunction of the unit 10. Here, this solution is described in the particular case where it is implemented in combination with the solution described in the preceding chapter. It corresponds to step 198 represented in FIG. 6.

The registers $R_1$ to $R_n$ and the register $R_{res}$ are, for example, registers of the set 12 of the microprocessor 2.

Hereinafter, step 198 is described in the particular case where the arithmetic and logic instructions whose execution one wishes to secure are the instructions of the following list:
1: The instruction for adding the data $D_1$ and $D_2$ contained in, respectively, the registers $R_1$ and $R_2$. This operation is designated by the pseudocode "ADD $R_1$, $R_2$".
2: The instruction for subtracting the data $D_1$ and $D_2$ contained in, respectively, the registers $R_1$ and $R_2$. The pseudocode used to designate this operation is "SUB $R_1$, $R_2$".
3: The instruction for multiplying the data $D_1$ and $D_2$ contained in, respectively, the registers $R_1$ and $R_2$. The pseudocode used to designate this operation is "MDL $R_1$, $R_2$".
4: The instruction for dividing the datum $D_1$ by the datum $D_2$ contained in, respectively, the registers $R_1$ and $R_2$. The pseudocode used to designate this operation is "DIV $R_1$, $R_2$".

5: The "exclusive OR" instruction between the data $D_1$ and $D_2$ contained in, respectively, the registers $R_1$ and $R_2$. The pseudocode used to designate this operation is "XOR $R_1$, $R_2$".
6: The "logical AND" instruction between the data $D_1$ and $D_2$ contained in, respectively, the registers $R_1$ and $R_2$. The pseudocode used to designate this operation is "AND $R_1$, $R_2$".
7: The "logical OR" instruction between the data $D_1$ and $D_2$ contained in, respectively, the registers $R_1$ and $R_2$. The pseudocode used to designate this operation is "OR $R_1$, $R_2$".
8: The instruction for right shift of a bit of the datum $D_1$ contained in the register $R_1$. The pseudocode used to designate this operation is "SHIFTR $R_1$".
9: The instruction for left shift of a bit of the datum $D_1$ contained in the register $R_1$. The pseudocode used to designate this operation is "SHIFTL $R_1$".

Hereinafter, the number associated by the list hereinabove with each arithmetic and logic instruction is used to identify this instruction. Thus, the instruction $I_1$ is addition, the instruction $I_2$ is subtraction and so on and so forth.

Here, the size of each datum $D_1$, $D_2$ and $D_{res}$ is for example equal to the size of the instructions $I_j$ of the instruction set of the microprocessor 2. Here, this size is therefore equal to 32 bits.

The structures of the registers $R_1$, $R_2$ and $R_{res}$ are identical and represented in the particular case of the register $R_1$ in FIG. 7.

The register R1 comprises:
a range of 32 bits containing the datum $D_1$,
a range containing a code $ECC_{D1}$ making it possible to detect and to correct an error in the datum $D_1$, and
nine successive ranges of bits containing, respectively, codes $C_{1,1}$ to $C_{1,9}$.

The code $ECC_{D1}$ is for example constructed as described in the case of the code $ECC_{Ij}$ except that it is constructed on the basis of the datum $D_1$ and not on the basis of the instruction $I_j$. For example, this code $ECC_{D1}$ is generated during the execution or during the generation of the binary code 30.

During the recording of the datum $D_1$ in the register $R_1$, each code $C_{1,1}$ to $C_{1,9}$ is generated by the module 28 with the aid of a preprogrammed relation defined in a generic manner in the following manner: $C_j{}^*=F^*(D_1)$ where:
the index i identifies a register from among the registers $R_1$ $R_2$ and $R_{res}$,
the index * identifies the arithmetic and logic instruction from among the instructions $I_1$ to $I_9$, and
the function F* is a function preprogrammed into the module 28 and associated with the arithmetic and logic instruction identified by the index *.

The size of the code $C_j{}^*$ is denoted $N_j{}^*$. The size $N_j{}^*$ is generally less than the size of the data $D_1$, $D_2$ and $D_{res}$ and often at least twice as small.

Here, the values 1, 2 and 3 of the index i designate, respectively, the registers $R_1$, $R_2$ and $R_{res}$. The values 1 to 9 of the index * designate, respectively, the instructions $I_1$ to $I_9$.

In the case of the instructions for which n is greater than or equal to 2, that is to say here in the case of the instructions $I_1$ to $I_7$, the function F* is a homomorphism from a set A furnished with the operation "*" to a set B furnished with the operation "#" such that $F^*(D_1{}^*D_2)=F^*(D_1)\#F^*(D_2)$. Here, the set A is the set of numbers that are codable on 32 bits, that is to say the set of possible data $D_1$ and $D_2$. The set B is the set of numbers that are codable on $N_j{}^*$ bits. Stated otherwise, by using the notations introduced previously, the function F* is such that $F^*(D_{res-p})=C_1{}^*\#C_2{}^*$ in case of absence of malfunction of the unit 10.

For each instruction $I_1$ to $I_7$, it is possible to find numerous functions F* which are appropriate. Hereinbelow, by way of illustration, for each of the instructions $I_1$ to $I_7$, one or more possible functions F* are given.

A function $EDC(D_j)$ which returns to an error-detecting code in respect of the datum $D_j$. This function EDC is for example a checksum. Such functions $EDC(D_j)$ exhibit one or more of the following properties:
$EDC(D_1+D_2)=EDC(D_1)+EDC(D_2)$,
$EDC(D_1-D_2)=EDC(D_1)-EDC(D_2)$,
$EDC(D_1\times D_2)=EDC(D_1)\times EDC(D_2)$,
where the symbols "+", "−", and "×" designate respectively, the operations of addition, subtraction and multiplication.

Thus, such functions EDC are appropriate for realizing the functions $F_1$, $F_2$ and $F_3$. It Will be noted moreover that in this particular case, the operations "#" and "*" on the sets B and A are identical.

The function $p(D_j)$ which returns 0 if the datum $D_j$ is even and 1 otherwise. This function exhibits the following property: $p(D_1+D_2)=p(D_1)$ XOR $p(D_2)$ and $p(D_1\times D_2)=p(D_1)$ OR $p(D_2)$, where the symbols "XOR" and "OR" designate, respectively, the "exclusive OR" and "OR" operations. This function is appropriate therefore for the implementation of the functions $F_1$ and $F_3$.

A logarithm function denoted "Log". A logarithm function exhibits the following properties: $Log(D_1\times D_2)=Log(D_1)+Log(D_2)$ and $Log(D_1/D_2)=Log(D_1)-Log(D_2)$, where the symbol "/" designates the division operation. Thus, a logarithm is appropriate for implementations of the functions $F_3$ and $F_4$. In this case, the operation "#" is addition or subtraction.

The function $CS(D_j)$ which returns the checksum of the datum $D_j$. This function exhibits the following properties:
$CS(D_1$ XOR $D_2)=CS(D_1)$ XOR $CS(D_2)$,
$CS(D_1$ AND $D_2)=CS(D_1)$ AND $CS(D_2)$,
$CS(D_1$ OR $D_2)=CS(D_1)$ OR $CS(D_2)$,
where the "AND" symbol designates the "AND" logic operation. Thus, this function is appropriate for an implementation of the functions $F_5$, $F_6$ and $F_7$.

In the case where n is equal to 1, that is to say here in the case of the instructions $I_8$ and $I_9$, the function F* is not a homomorphism. In this case, the function F* is such that there exists a function T* such that $F^*(D_1)=T^*(F^*(D_1))$. Stated otherwise, the function T* is invariant under $F^*(D_1)$. The function T* therefore returns the code $C_1{}^*$ from the code $C_1{}^*$.

In the case of the instruction $I_9$, the function $F_9$ is for example the function which calculates a checksum on all the bits of the datum $D_1$ except on its highest-order bit, that is to say without taking into account the leftmost bit of the datum $D_1$. The function $T_9$ is then the same checksum on all the bits of $F_9(D_1)$ except the lowest-order bit, that is to say that situated furthest to the right in $F_9(D_1)$. With such functions $F_9$ and $T_9$, we do indeed have the following relation: $F_9(D_1)=T_9(F_9(D_1))$. These functions $F_9$ and $T_9$ are therefore appropriate for the instruction $I_9$.

Moreover, by choosing the functions $F_8$ and $T_8$ equal, respectively, to the functions $T_9$ and $F_9$, a possible implementation for the functions $F_8$ and $T_8$ is obtained.

FIG. 8 represents the detail of the operations carried out by microprocessor 2 during the execution of step 198 to secure the execution of the arithmetic and logic instructions $I_1$ to $I_9$.

Each time an instruction for loading a datum into one of the registers $R_j$ is executed by the unit 10, during step 190, the datum $D_j$, and the code $EEC_{Dj}$ are written into this register $R_j$.

In response, during an operation 202, for each instruction $I_1$ to $I_9$, the module 28 calculates each of the codes $C_{j}{*}$ corresponding with the aid of the relation $C_{j}{*}=F{*}(D_j)$, where:

$D_j$ is the new datum loaded into the register $R_j$, and the function $F{*}$ is the function preprogrammed into the module 28 and associated with the operation "*".

Each of the codes $C_{j}{*}$ thus calculated is recorded in the registers $R_j$ as represented in FIG. 7.

Before the execution of the instructions $I_1$ to $I_7$, the operation 202 is executed once for the datum $D_1$ and once for the datum $D_2$. In the case of the instructions $I_8$ and $I_9$, it suffices that the operation 202 be executed just once for the datum $D_1$ before the execution of one of the instructions $I_8$ and $I_9$.

Thereafter, each time an arithmetic and logic instruction is on the point of being executed by the unit 10, just before its execution, during an operation 204, the module 28 verifies whether there exists an error in the datum contained in the register $R_j$ identified by an operand of the instruction $I_j$ to be executed.

During this operation, for each register $R_j$ concerned, the module 28 verifies, with the aid of the code $EEC_{Dj}$, whether the datum $D_j$ currently recorded in this register does or does not exhibit an error. This operation is, for example, carried out as described in the case of the operation 170.

If the module 28 detects an error, it undertakes step 172 and, in parallel, an operation 206. During the operation 206, it corrects the datum $D_j$. The operation 206 is for example carried out in a similar manner to what was described for the operation 174.

If the module 28 does not detect any error or on completion of the operation 206, during step 190, the microprocessor 2 decodes the instruction $I_j$ and then the unit executes it and records the result $D_{res-p}$ in the register $R_{res}$.

In response, during an operation 210, the module 28 calculates the code $ECC_{D3}$ and all the codes $C_3{*}$ on the basis of the datum $D_{res-p}$ recorded in the register $R_{res}$ and records these various codes calculated in the register $R_{res}$. Typically, the calculation of the codes $C_3{*}$ is carried out here as described for the operation 202.

Thereafter, during an operation 212, the module 28 verifies whether a malfunction of the unit 10 has occurred during the execution of the arithmetic and logic instruction.

If the instruction executed during step 190 is one of the instructions $I_1$ to $I_7$, then the module 28 executes the following sub-operations.

During a sub-operation 214, the module 28 selects, from among the instructions $I_1$ to $I_7$, that which corresponds to the arithmetic operation executed. In the following sub-operations, the symbol "*" designates the instruction thus selected and $F{*}$ the preprogrammed function associated therewith.

During a sub-operation 216, the module 28 also selects, from among the various codes $C_3{*}$ recorded in the register $R_{res}$, the sole code $C_3{*}$ which corresponds to the selected instruction. Hereinafter, the code $C_3{*}$ selected during this sub-operation is denoted $C_{res-p}$.

Next, during a sub-operation 218, the module 28 also calculates a code $C_{res-t}$ by combining the codes $C_1{*}$ and $C_2{*}$ recorded, respectively, in the registers $R_1$ and $R_2$ prior to the execution of the arithmetic and logic instruction. More precisely, the module 28 calculates the code $C_{res-t}$ with the aid of the following relation: $C_{res-t}=C_1{*}\#C_2{*}$, where the symbol "#" designates the operation such that $F{*}(D_1{*}D_2)=F{*}(D_1)\#F{*}(D_2)$.

For example, in the case of the instruction $I_1$ and of the parity function p(..) previously described, the operation "#" is the "exclusive OR" operation. In this case, the code $C_{res-t}$ is the result of the following exclusive or $C_{1,1}$ XOR $C_{2,1}$.

Finally, during a sub-operation 220, the module 28 compares the codes $C_{res-p}$ and $C_{res-t}$ calculated. If these codes are different, the module 28 triggers the execution of step 172. In the converse case, no signalling of an execution fault is triggered and the method continues via the execution of the following instruction of the queue 22.

The execution of these sub-operations 214 to 220 makes it possible to detect a malfunction of the unit 10 since the calculated codes $C_{res-p}$ and $C_{res-t}$ are identical only if the unit 10 has correctly executed the operation "*". This is explained by the following relation: $C_{res-p}=F{*}(D_{res-p})=F{*}(D_1{*}D_2)=F{*}(D_1)\#F{*}(D_2)=\#C_2{*}=C_{res-t}$.

If the instruction executed during step 190 is one of the instructions $I_8$ and $I_9$, then during a sub-operation 222, the module 28 selects the function $T{*}$ associated with this arithmetic and logic instruction, that is to say the function $T_8$ if dealing with the instruction $I_8$, otherwise the function $T_9$.

During a sub-operation 224, the module 28 selects the code $C_1{*}$ associated with the operation "*" executed during step 190. This selected code is denoted $C_{res-t}$.

During a sub-operation 226, the module 28 calculates a code $C_{res-p}$ with the aid of the relation $C_{res-p}=T{*}(D_{res-p})$ where $T{*}$ is the function selected during sub-operation 222.

After sub-operation 224, the method continues via sub-operation 220.

In the case of the instructions $I_8$ and $I_9$, the codes $C_{res-p}$ and $C_{res-t}$ are identical solely if the unit 10 has operated correctly. This is demonstrated with the aid of the following relation: $C_{res-p}=T{*}(D_{res-p})=T{*}(F{*}(D_1))=F{*}(D_1)=C_1{*}=C_{res-t}$.

CHAPTER V: SECURING OF THE DATA

The binary code 30, in addition to the machine code 32, can comprise data to be processed during the execution of the machine code 32. Moreover, during the execution of the machine code 32, the latter may generate data. These data are typically contained in data blocks which each correspond to a predetermined range of addresses of the memory 4 dedicated to the storage of these data. Such data blocks are also known by the term "data segment" or of "data page".

To read a datum from a data block, the machine code 32 comprises a loading instruction which, when it is executed by the microprocessor 2, causes the loading of a code line $LD_j$ situated at the address $@_j$ inside this data block. In this case, in contradistinction to the code lines $LI_j$ described in chapter III, the line $LD_j$ codes a datum $D_j$ to be processed by the microprocessor and not an instruction $I_j$ executable by the unit 10.

To write a datum to a data block, the machine code 32 comprises a writing instruction which, when it is executed by the microprocessor 2, causes the writing of a line $LD_j$ in one of the data blocks.

In a similar manner to what was described in the case of the instructions $I_j$, a datum $D_j$ may be corrupted in the memory 4 or in registers of the microprocessor 2 by the implementation of attacks such as an attack by fault injection. Moreover, an attacker can also try to modify the operation of the binary code 30 by moving the data coded in the memory 4 or by replacing them with older data. Thus, it is also useful to secure the data recorded in the memory 4 or in internal registers of the microprocessor.

For this purpose, each code line $LD_j$ coding a datum exhibits the structure represented in FIG. 9. The structure of the lines $LD_j$ is practically identical to that of the lines $LI_j$ coding instructions. More precisely, the structure of the line $LD_j$ is identical to the structure of the line $LI_j$ except that the cryptogram $CI_j^*$ is replaced with a cryptogram $CD_j^*$. Given that the codes $MAC_j$ and $ECC_{Lj}$ of the line $LD_j$ are calculated as already described in the case of the lines $LI_j$, they are here designated by the same symbols and will not be described again.

The cryptogram $CD_j^*$ is obtained by encrypting, with the function $f_{ka}$, a concatenation $CD_j$. Here, the function $f_{ka}$ is the same as that already described in the case of the lines $LI_j$. Thus, the cryptogram $CD_j^*$ is obtained with the aid of the following relation: $CD_j^* = f_{kB}(CD_j^*, iv_j)$. The function $f_{ka}$ is preprogrammed into the module 28.

The concatenation $CD_j$ is the concatenation of the datum $D_j$ and of a code $ECC_{Dj}$. The code $ECC_{Dj}$ makes it possible to detect and to correct an error in the datum $D_j$. It is typically constructed as described for the code $ECC_{Ij}$.

The cryptogram $CD_j^*$ differs from the cryptogram $CI_j^*$ in that the initialization vector $iv_j$ used during the encryption of the concatenation $CD_j$ is dependent on the address $@_j$ where the line $LD_j$ is recorded. For this purpose, the module 28 comprises a preprogrammed function $F_{jv}$ which, with each address $@_j$ of the memory 4 associates a different initialization vector $iv_j$. Preferably, the function $F_{jv}$ is such that with any two consecutive addresses $@_j$ and $@_{j+1}$, it associates two different vectors, respectively $iv_j$ and $iv_{j+1}$, and the disparity between the numerical values of these two vectors $iv_j$ and $iv_{j+1}$ varies as a function of the index j. For example, the function $F_{jv}$ is a hash or encryption function. The following relation therefore holds: $iv_j = F_{jv}(@_j)$.

The securing of the data $D_j$ will now be described in greater detail with reference to the method of FIG. 10 and in the particular case where it is implemented in combination with the teachings of the preceding chapters. More precisely, the securing of the data $D_j$ occurs each time the instruction executed during step 190 is an instruction for loading or writing or processing a datum $D_j$. The method of FIG. 10 represents the operations executed during step 250 to secure the data $D_j$.

Each time that during step 190 the unit 10 executes an instruction which leads to recording a new datum $D_j$ in a register, denoted here $R_j$, of the microprocessor 2, during an operation 252, the module 28 calculates the code $ECC_{Dj}$ on the basis of the datum $D_j$. This code $ECC_{Dj}$ calculated is thereafter concatenated with the datum $D_j$ in the register $R_j$.

Subsequently, during a new execution of step 190, the unit 10 executes an instruction for recording the datum $D_j$ contained in the register $R_j$ at the address $@_j$ of the memory 4.

In response, during an operation 254, the module 28 constructs the code line $LD_j$ which must be recorded at the address $@_j$ on the basis of the datum $D_j$. Accordingly, during this operation, the module 28:
  calculates an initialization vector $iv_j$ with the aid of the relation $iv_j = F_{jv}(@_j)$, and then
  encrypts the concatenation $CD_j$ of the datum $D_j$ and of the code $ECC_{Dj}$ with the aid of the function $f_{ka}$ and of the initialization vector $iv_j$ calculated according to the following relation: $CD_j^* = f_{ka}(CD_j; iv_j)$, and then
  calculates the code $MAC_j$ on the basis of the cryptogram $CD_j^*$, and then
  calculates the code $ECC_{Lj}$ on the basis of the cryptogram $CD_j^*$ and of the code $MAC_j$ calculated.

Thereafter, the line $LD_j$ constructed is transferred and recorded in the memory 4 at the address $@_j$.

The address $@_j$ is situated inside a predetermined data block $BD_m$. Each data block $BD_m$ is associated with a code $EDC_m$ which makes it possible to detect an error if one of the code lines contained in this block $BD_m$ has been modified from the last update of the code $EDC_m$. The code $EDC_m$ is therefore an error-detecting code.

The code $EDC_m$ may be contained in the memory 4, for example at the end of the data block $BD_m$ associated with this code or in a register of the microprocessor associated with the block $BD_m$.

During an operation 256, immediately after or in parallel with the execution of the instruction for writing the new line $LD_j$ to the block $BD_m$, the code $EDC_m$ associated with this block $BD_m$ is updated and then recorded. Here, to accelerate the execution of this operation 256, the code $EDC_m$ is defined by the following relation: $EDC_m = MAC_1$ XOR $MAC_2$ XOR ... XOR $MAC_{mm}$, where:
  the symbol XOR designates the "exclusive OR" operation,
  the codes $MAC_1$ to $MAC_{mm}$ are the codes $MAC_j$ of all the lines $LD_j$ of the block $BD_m$, and
  mm is the number of lines $LD_j$ contained in the block $BD_m$.

When the code EDC is thus defined, the operation 256 can be carried out with the aid of the following relation: $EDC_m = EDC_m$ XOR $MAC_{jold}$ XOR $MAC_{jnew}$, where:
  the symbols $EDC_m$ on the right and on the left of the "=" sign designate, respectively, the old value of the code $EDC_m$ before the recording of the new line $LD_j$ and the new value of the code $EDC_m$ after the recording of this new line $LD_j$,
  $MAC_{jold}$ designates the code $MAC_j$ of the old line $LD_j$ which is replaced with the new line $LD_j$, and
  $MAC_{jnew}$ designates the code $MAC_j$ of the new line $LD_j$ which is recorded at the address $@_j$.

Thus, the number of operations to be executed to update the code $EDC_m$ is limited.

The operation 256 can be carried out by the module 28 or by a calculation unit incorporated into the memory 4. Such memories 4 incorporating a calculation unit are known by the term "smart RAM" or "In-memory computing".

If the next instruction to be executed during step 190 is an instruction for loading a line $LD_j$, then, during an operation 260, the module 28 verifies, with the aid of the code $EDC_m$, whether an error exists in the block $BD_m$ which contains this line $LD_j$.

If the module 28 detects that an error exists, then the method continues via the execution of step 172 and the line $LD_j$ is not loaded into the microprocessor 2.

If the module 28 does not detect any error, then the unit 10 executes an instruction for loading the line $LD_j$ and the latter is loaded into a register of the microprocessor 2. Typically, this loading instruction comprises an operand which indicates the address $@_j$ at which the line $LD_j$ to be loaded is situated. Here, when the unit 10 executes this loading instruction, it loads the line $LD_j$ into a register $R_j$ of the set 12 for example.

Thereafter, the module 28 executes operations 270, 274, 276 and 278 which are identical, respectively, to the operations 170, 174, 176 and 178 of the method of FIG. 6 except that it is the corresponding codes contained in the line $LD_j$ which are used and not those contained in a line $LI_j$.

Moreover, during the operation 278, the module 28 calculates the initialization vector $iv_j$ necessary to decrypt the cryptogram $CD_j^*$ on the basis of the address $@_j$ and with the aid of the relation $iv_j=F_{jv}(@_j)$.

Once the cryptogram $CD_j^*$ has been decrypted, during an operation 280, the module 28 records the datum $D_j$ decrypted and the code $ECC_{Dj}$ decrypted in the register $R_j$ while waiting for this datum to be processed by the unit 10.

When the next instruction which will be executed by the unit 10 is an instruction which processes the datum $D_j$, the module 28 undertakes operations 284 and 286. The module 28 identifies that the next instruction to be executed will process the datum $D_j$ since this instruction generally comprises an operand which identifies the register $R_j$ in which the datum $D_j$ is recorded. The operations 284 and 286 are, for example, identical, respectively, to the operations 184 and 186 of the method of FIG. 6, except that here, it is the datum $D_j$ and the code $ECC_{Dj}$ which are used and not the instruction $I_j$ and the code $ECC_{Ij}$.

Thereafter, on completion of the operation 286 or if no error was detected during the operation 284, the unit 10 executes the instruction which processes the datum $D_j$.

The data securing method described here furthermore presents the same advantages as those presented in chapter III in particular because of the fact that the structure of the line $LD_j$ is practically identical to that of the line $LI_j$.

Moreover, the fact of encrypting the datum $D_j$ with the aid of an initialization vector $iv_j$ which depends on the address $@_j$ makes it possible to detect whether a line $LD_j$ has been moved inside a data block $BD_m$. Indeed, if two lines $LD_1$ and $LD_2$ of one and the same block $BD_m$ are swapped, this does not necessarily modify the code $EDC_m$ and such a swapping of the lines $LD_1$ and $LD_2$ is not necessarily detected during the operation 260. On the other hand, since the datum $D_1$ is encrypted with an initialization vector $iv_1$ which depends on the address $@_1$, if the line $LD_1$ is moved and is situated at an address $@_2$ in the memory 4, during the loading of this line on the basis of this address $@_2$, the cryptogram $CD_1^*$ will be decrypted with the aid of the initialization vector $iv_2$ and not with the aid of the vector $iv_1$. Such incorrect decryption of the datum $D_1$ and of the code $ECC_{D1}$ is then detected during the operation 284.

Step 250 described here makes it possible also to detect an attack consisting in replacing a line $LD_1$ by a different line $LD_{1old}$ previously recorded at the same address $@_1$. Such a replacement will not be able to be detected during the execution of the operation 284. On the other hand, it will be detected during the execution of the operation 260 since the lines $LD_1$ and $LD_{1old}$ are different.

FIG. 11 represents a compiler 300 able to automatically generate the binary code 30 on the basis of a source code 302. For this purpose, the compiler 300 typically comprises a programmable microprocessor 304 and a memory 306. The memory 306 contains the instructions and the data necessary for, when they are executed by the microprocessor 304, automatically generating the binary code 30 on the basis of the source code 302. In particular, during the compilation of the source code 302, the microprocessor 304 automatically generates the appropriate initialization vectors $iv_k$ and the code lines $LI_j$ and $LD_j$. The design and production of such a compiler are within the scope of the person skilled in the art on the basis of the explanations given in this description.

CHAPTER VI: VARIANTS

Variants of the Apparatus 1:

The memory 4 can also be a nonvolatile memory. In this case, it is not necessary to copy the binary code 30 into this memory before launching the execution thereof since it is already situated therein.

As a variant, the memory 4 can also be an internal memory integrated into the microprocessor 2. In the latter case, it is produced on the same substrate as the other elements of the microprocessor 2. Finally, in other configurations, the memory 4 is composed of several memories some of which are internal memories and others external memories.

The main memory 4 can comprise a first volatile memory of large capacity and a second volatile memory of smaller capacity but, in which the reading and writing operations are faster. The second memory is known by the term "cache memory". The cache memory can be a memory external to the microprocessor 2 or an internal memory of the microprocessor 2. In certain embodiments, several different levels of cache memories can be used.

Numerous different hardware architectures are possible for producing the module 28. In particular, the module 28 can be made by combining several hardware blocks of the microprocessor 2 fulfilling respective functions and each situated in a different area of the chip of the microprocessor 2.

Variants of the Securing of the Machine Code:

As a variant, certain functions or parts of the binary code 30 are not secure. To manage the execution of such a binary code which comprises at one and the same time a secure function and non-secure functions, the instruction set of the microprocessor 2 can be supplemented with:

an instruction for activating a secure mode of operation of the microprocessor 2, and an instruction for deactivating this secure mode.

In this case, the instruction for activating the secure mode is situated in the binary code 30 just before the call to the secure function and the instruction for deactivating the secure mode is situated just after the end of the secure function. When the instruction for activating the secure mode is loaded by the microprocessor 2, in response, the module 28 begins to process the following instructions and the data of the binary code as described in the preceding chapters. When the instruction for deactivating the secure mode is loaded by the microprocessor 2, in response, the module 28 is deactivated. In the latter case, the processing of the following instructions and data of the binary code are not processed by the module 28 but loaded directly into the queue 22 or into the registers of the set 12.

As a variant, an "update" instruction is added to the instruction set of the microprocessor. When this "update" instruction is executed by the microprocessor 2, it indicates to the module 28 that from now, the new vector $iv_k$ previously loaded in the memory 29 must be used to decrypt the code lines $LI_j$. Hence, in this case, the use of a new initialization vector $iv_k$ can be triggered other than by the execution of a branching instruction. In this case, the method described can also be implemented with implicit branching instructions. Indeed, the last instruction which terminates with an implicit branching instruction is then the "update" instruction. Instead of implementing an "update" instruction as a separate instruction in the instruction set of the microprocessor, it is possible to add an extra bit to each instruction of the instruction set of the microprocessor 2 and to trigger the change of initialization vector ivk only when this extra bit takes a specific value.

Variants of the Structure of a Line $L_{Ij}$ or $LD_j$

As a variant, the structure of a code line described with reference to FIG. 2 or 9 is implemented only for the instructions $I_j$ or only for the data $D_j$ of the secure function.

The code $ECC_{Ij}$ or the code $ECC_{Dj}$ can be replaced with a simple error-detecting code making it possible only to detect an error in the instruction $I_j$ or the datum $D_j$ with which said code is concatenated. An error-detecting code does not make it possible to correct the detected error. In this case, the error correction operation 186 or 286 is omitted. Hence, as soon as the module 28 detects an error in a decrypted instruction $I_j$ or in a decrypted datum $D_j$, for example, the execution of the secure function is systematically interrupted.

In a simplified variant, the code $ECC_{Ij}$ or $ECC_{Dj}$ is omitted. In this case, the cryptogram $CI_j^*$ or $CD_j^*$ is only the cryptogram of the instruction $I_j$ or of the datum $D_j$. In this embodiment, the microprocessor 2 is no longer capable of detecting a modification of the instruction $I_j$ or of the datum $D_j$ that were to occur between the instant at which the latter is recorded in the queue 22 or a register of the set 12 and the instant at which it is executed or processed by the unit 10.

The code $ECC_{Lj}$ can be replaced with a simple error-detecting code making it possible only to detect an error in the cryptogram $CI_j^*$ or $CD_j^*$ and/or the code $MAC_j$ which are contained in the same code line. In this case, the correction operation 174 or 274 is omitted. Hence, as soon as the module 28 detects an error in the cryptogram $CI_j^*$ or $CD_j^*$ or in the code $MAC_j$, for example, the execution of the secure function is interrupted.

In another variant, the code $ECC_{Lj}$ is constructed so as to allow only the detection of an error, either only in the cryptogram $CI_j^*$ or $CD_j^*$ or only in the code $MAC_j$.

The code $ECC_{Lj}$ can be omitted. In this case, an error in the cryptogram $CI_j^*$ or $CD_j^*$ or in the code $MAC_j$ can only be detected during the execution of the operation 176 or 276 of verifying the integrity and authenticity of the cryptogram. The detection of an error with the aid of an MAC code is generally more complex than with the aid of a simple error-detecting code or of a simple error-correcting code. Moreover, when the code $ECC_{Lj}$ is omitted, in the case where an error exists in the cryptogram $CI_j^*$ or $CD_j^*$ or the $MAC_j$, it is not possible to correct this error. In the latter case, for example, the execution of the secure function is therefore systematically interrupted in case of error.

The function used to generate the cryptogram $CD_j^*$ may be different from that used to generate the cryptogram $CI_j^*$. For example, these two functions differ through the fact that they use different encryption keys.

Variants of the Securing of the Arithmetic and Logic Unit:

The number of codes $C_j^*$ calculated and associated with the loaded datum $D_j$ is not necessarily equal to the total number of different arithmetic and logic instructions which exist in the instruction set of the microprocessor 2. For example, the number of codes $C_j^*$ can be reduced when the same codes $C_j^*$ are used for various arithmetic and logic instructions. For example, the code $C_{j,4}$ can be omitted if the functions $F_3$ and $F_4$ are both logarithmic functions. Indeed, in this case, when the arithmetic and logic instruction to be executed is a multiplication, during the operation 284, the module 28 calculates the code $C_{res-t}$ with the aid of the following relation: $C_{res-t}=C_{1,3}+C_{2,3}$. To verify that the unit 10 has correctly carried out an arithmetical and logical division instruction, the module 28 can calculate the code $C_{res-t}$ with the aid of the following operation: $C_{res-t}=C_{1,3}-C_{2,3}$, where the codes $C_{1,3}$ and $C_{2,3}$ are the same as those used to verify the multiplication operation. In this case, it is not necessary to calculate the codes $C_{1,4}$ and $C_{2,4}$ since they are identical, respectively, to the codes $C_{1,3}$ and $C_{2,3}$. On the other hand, the code $C_{3,4}$ must be calculated on the basis of the datum $D_{res-p}$. In a similar manner, it is possible to detect the malfunction of the unit 10 during the execution of a subtraction instruction by calculating the code $C_{res-t}$ with the aid of the following relation: $C_{res-t}=C_{1,1}-C_{2,2}$ in the case where the function $F_1$ is also a homomorphism for the set B furnished with the subtraction operation.

In another embodiment, it is possible to detect a malfunction of the unit 10 only when it executes a single or a restricted group of arithmetic and logic instructions of the instruction set of the microprocessor 2. In this case, there exist arithmetic and logic instructions for which the microprocessor does not verify whether they have been executed correctly by the unit 10. This makes it possible to reduce the number of codes $C_j^*$ used.

As a variant, the code $C_j^*$ is not recorded in the same register $R_j$ as that where the datum $D_j$ is recorded but in another register specifically associated with this register $R_j$.

Variants of the Securing of the Data:

The structure of the lines $LD_j$ used to secure the data can be simplified. For example, the codes $MAO_j$ and/or $ECC_{Lj}$ can be omitted.

The code $ECC_{Dj}$ can be replaced with a simple code for detecting error in the datum $D_j$.

As a variant, the function $F_{jv}$ is identical to the function $f_{ka}$ except that it is applied to the address $@_j$. The function $F_{jv}$ can also use the same encryption algorithm as the function $f_{ka}$ but with a different encryption key from the key ka.

In a simplified variant, the function $F_{jv}$ is the identity function. In this case, the initialization vector $iv_j$ is systematically equal to the address $@_j$.

In other embodiments, to detect a movement of a line $LD_j$, the code $MAC_j$ is calculated as a function of the vector $iv_j$. For example, the code $MAC_j$ is calculated on the basis of the concatenation of the cryptogram $CD_j^*$ and of the vector $iv_j$. The code $MAC_j$ can also be calculated on the basis of a combination of the cryptogram $CD_j^*$ and of the vector $iv_j$ such as the following combination: $CD_j^*$ XOR $iv_j$. In the case where the code $MAC_j$ depends on the vector $iv_j$, then it can be used in place of the code $ECC_{Dj}$ to detect an error in case of movement of the line $LD_j$ in the memory 4. Indeed, in this case, during verification of the integrity and authenticity of the cryptogram $CD_j^*$, the module 28:

calculates the vector $iv_j$ with the aid of the relation $iv_j=F_{jv}(@_j)$, and then combines the cryptogram $CD_j^*$ read at the address $@_j$ with the vector $iv_j$ calculated, and then verifies the integrity and authenticity of this combination on the basis of the code $MAC_j$ contained in the same line $LD_j$.

If this line $LD_j$ has been moved, the calculated initialization vector is different from that expected. Hence, the integrity of the combination of the cryptogram $CD_j^*$ and of the initialization vector cannot be verified, thus triggering the signalling of an execution fault. It will be noted that in this embodiment, it is possible to detect a movement of the line $LD_j$ without even having to decrypt the cryptogram $CD_j^*$. In this variant, to detect a movement of the line $LD_j$, the codes $ECC_{Dj}$ and $ECC_{Lj}$ can be omitted.

In a similar manner to what was described hereinabove for the code $MAC_j$, the code $ECC_{Lj}$ can also be constructed in such a way as to depend on the vector $iv_j$. In this case, the movement of the line $LD_j$ is detected during the verifications of the code $ECC_{Lj}$. Hence, to detect a movement of the line $LD_j$, the codes $ECC_{Dj}$ and $MAC_j$ can be omitted.

Step 250 has been described in the particular case of the securing of a datum $D_j$. However, as a variant, the same step can be carried out on code lines comprising an instruction $I_j$ in place of the datum $D_j$. In this case, the cryptogram $CI_j^*$ is obtained by using an initialization vector $iv_j$ and not the vector $iv_k$ as described in chapter III. Since the vector $iv_j$ is dependent on the address $@_j$ where this code line $LI_j$ is recorded, it is then possible to detect the movement of a code line coding an instruction to be executed. In this case, typically, the code $ECC_{I_j}$ is used to detect this movement and no longer to detect a modification of the control flow.

In the embodiments described up until now, both the datum $D_j$ and the code $ECC_{Dj}$ are coded as a function of the vector $iv_j$ since the cryptogram $CD_j^*$ is encrypted with the aid of this vector $iv_j$. As a variant, either only the datum $D_j$ or only the code $ECC_{Dj}$ is coded as a function of the vector $iv_j$. For example, in the code line, the cryptogram of the datum $D_j$ is obtained on the basis of an encryption function which does not use the vector $iv_j$, while the cryptogram $ECC_{Dj}^*$ of the code $ECC_{Dj}$ is obtained with the aid of the encryption function $f_{ka}(ECC_{Dj}; iv_j)$. In this case, during the operation 278, the module 28 decrypts the cryptogram of the datum $D_j$ without using the vector $iv_j$ and decrypts the cryptogram $ECC_{Dj}^*$ by using this vector $iv_j$. Thereafter, the remainder of the method is identical to what has already been described. In a simplified embodiment, since the datum $D_j$ does not need to be coded as a function of the vector $iv_j$, it is also possible not to encrypt it. For example, the code line then contains the plaintext datum $D_j$ and the cryptogram $ECC_{Dj}^*$. Hence, during the operation 278, the decryption of the datum $D_j$ is omitted since it suffices to extract it from the bit range in which it is contained in the line $LD_j$.

Conversely, it is also possible to modify the structure of the lines $LD_j$ in such a way that only the datum $D_j$ is coded as a function of the vector $iv_j$. For example, the line $LD_j$ comprises a cryptogram $D_j^*$ of the datum $D_j$ obtained by encrypting it with the aid of the function $f_{ka}(D_j; iv_j)$ and a cryptogram $ECC_{Dj}^*$ obtained by encrypting the code $ECC_{Dj}$ with the aid of an encryption function independent of the vector $iv_j$. During the operation 270, the module 28 decrypts the cryptogram $D_j^*$ with the aid of the vector $iv_j$ calculated and decrypts the cryptogram $ECC_{Dj}^*$ without using this vector $iv_j$.

Up until now, it is an encryption function which has been described as exemplary embodiment making it possible to code the datum $D_j$ or the code $ECC_{Dj}$ as a function of the vector $iv_j$. This encryption function can however be as simple as a simple "OR" logic operation between the datum $D_j$ and the vector $iv_j$ or between the code $ECC_{Dj}$ and the vector $iv_j$.

In another simplified embodiment, the code $ECC_{Dj}$ and the code $MAC_j$ are omitted. In this case, at least one of the cryptogram $D_j^*$ and of the code $ECC_{Lj}$ is constructed as a function of the vector $iv_j$.

For the detection of the movement of the line $LD_j$, it is not necessary to use an error-correcting code. A simple error-detecting code is sufficient. Thus, as a variant, the error-correcting code or codes are replaced with error-detecting codes.

In another embodiment, the code $EDC_m$ is omitted. In this case, the operations of processing of this code $EDC_m$ are also omitted, such as the operations 256 and 260.

It is possible to construct the code $EDC_m$ differently. For example, as a variant, the code $EDC_m$ is an error-correcting code which makes it possible in addition to correct an error in the data block $BD_m$. In this case, when an error is detected in the block $BD_m$, the code $EDC_m$ is used to correct the detected error, and then the method continues via the operation 270.

Other procedures for calculating the code $EDC_m$ are possible. For example, as a variant, the code $EDC_m$ is a checksum or a message authentication code.

Advantageously the code $EDC_m$ is recorded in the memory 29.

Other Variants:

In another variant, the keys ka and k' are the same.

The key ka can be prerecorded in the memory 29. In this case, the cryptogram ka* can be omitted from the block 34.

A code line can be longer than a machine word. In this case, each code line is composed of several machine words generally situated at immediately consecutive memory addresses in the memory 4. In this case, a code line is loaded into the microprocessor 2 not in a single reading operation, but by executing several reading operations. Each reading operation loads a respective machine word of the code line into the microprocessor.

As a variant, the operation 176 or 276 continues systematically via the operation 178 or 278 even if it has not been possible to confirm the integrity or authenticity of the cryptogram. In this case, the operation 176 or 276 serves to trigger the signalling of an execution fault without interrupting the execution of the binary code.

Everything that was described in chapter III can be implemented independently of what was described in the other chapters. For example, steps 198 and 250 can be omitted.

In another variant, the method described in chapter III for detecting an error in the control flow is implemented independently of what was described in chapters IV and V but also independently of some of the characteristics of the method described in chapter III. In particular, to be capable of detecting an error in the control flow, the codes $ECC_{Lj}$ and $MAC_j$ can be omitted, as well as all the operations of processing of these two codes.

Everything that was described in chapter IV can be implemented independently of what was described in the other chapters. For example, what was described in chapter IV can be implemented:

without the binary code being encrypted,
without the code $MAC_j$ being included in each code line,
without the codes $ECC_{Lj}$ and $ECC_{Ij}$ or $ECC_{Dj}$ being implemented,
without the data $D_j$ being encrypted with the aid of the vector $iv_j$.

Everything that was described in chapter V can also be implemented independently of what was described in the other chapters. For example, what was described in chapter V can be implemented:

without the data $D_j$ being encrypted,
while preserving only a single error-detecting code chosen from the group consisting of the codes $ECC_{Lj}$, $MAC_j$ and $ECC_{Dj}$, and
without a code $C_j^*$ being calculated on each loading of a datum into a register.

All the embodiments described in this text and, in particular, the different variants, can be combined together.

CHAPTER VII: ADVANTAGES OF THE EMBODIMENTS DESCRIBED

Advantage of Securing the Binary Code:

The encryption of the instructions $I_j$ or of the data $D_j$ makes it possible to guarantee the confidentiality of the binary code 30, thereby rendering the "Reverse Engineering" of the binary code very difficult. The verification of the integrity of the cryptogram $CI_j^*$ or $CD_j^*$ makes it possible to detect the modifications of the binary code that are caused, for example, by attacks such as the injection of faults into the memory 4 or the medium 6. Verifying the authenticity of the instructions and of the data makes it possible to detect and to render very difficult the addition of extra instructions into the binary code 30 by an attacker, for example, so as to introduce malicious software such as viruses thereinto. Indeed, even if the attacker knows the algorithm used to encrypt the instructions $I_j$ or the data $D_j$, he does not know the secret key, k' used to construct the code $MAC_j$.

The verification, with the aid of the code $ECC_{Ij}$ or $ECC_{Dj}$, of the existence of an error in the instruction $I_j$ or the datum $D_j$ just before it is used makes it possible to detect a modification of this instruction or of this datum $D_j$ whilst it is stored in the queue 22 or a register of the set 12. Indeed, such modifications may be caused by injecting faults into the queue 22 or the registers of the set 12. Thus, the use of the code $ECC_{Ij}$ or $ECC_{Dj}$ makes it possible to detect this type of attack.

The fact that the code $ECC_{Ij}$ or $ECC_{Dj}$ is an error-correcting code and not only an error-detecting code, makes it possible to render the method of execution more robust in relation to attacks by injecting faults into the queue 22 or into the registers of the set 12. Indeed, in this case, the error-correcting code often makes it possible to correct the error introduced into the instruction $I_j$ or into the datum $D_j$ so that despite the presence of such errors, the secure function continues to execute correctly.

By using the code $ECC_{Lj}$, an error in the cryptogram $CI_j^*$ or $CD_j^*$ or in the code $MAC_j$ can be detected more rapidly than if only the code $MAC_j$ were used for this. The use of the code $ECC_{Lj}$ therefore makes it possible to accelerate the execution of the binary code.

The use of an error-correcting code for the code $ECC_{Lj}$ makes it possible to render the method claimed more robust in relation to attacks by fault injection into the memory 4 or into the medium 6. Indeed, in this case, the error-correcting code often makes it possible to correct the cryptogram $CI_j^*$ or $CD_j^*$ or the code $MAC_j$ so that despite the presence of such errors, the secure function executes correctly.

Using different secret keys to decrypt the cryptogram $CI_j^*$ or $CD_j^*$ and to verify the integrity and authenticity of the code $MAC_j$ makes it possible to increase the security of the method.

During the execution of a preceding base block, by loading the initialization vector $iv_k$ necessary for the decryption of the following base block $BB_k$ into the microprocessor, it is made possible to trigger the signalling of an execution fault if an attacker tries to modify the order in which the base blocks of the machine code 32 must normally be executed. More precisely, such a modification of the control flow will be detected by virtue of the code $ECC_{Ij}$ during the operation 184.

The recording in a register of the microprocessor of the initialization vector $iv_k$ to be used to decrypt the base block executed after the execution of a secure sub-function makes it possible to call this secure sub-function from various base blocks of the machine code 32 of the secure function. Indeed, in this case, it is not possible to code the vector $iv_k$ to be used in the last base block of the secure sub-function since the following base block is not always the same and is therefore not always encrypted with the aid of the same vector $iv_k$.

The verification of the authenticity of the application key ka on the basis of various cryptographic certificates at least one of which is recorded in the secure memory of the microprocessor makes it possible to guarantee that the binary code 30 was generated by an author authorized to do so and not by a third-party who does not have the right to generate such binary code for the microprocessor 2.

Advantages of Securing the Arithmetic and Logic Unit:

When faults are injected into the unit 10, the result $D_{res-p}$ obtained on completion of the execution of the arithmetic and logic operation may be different from the expected theoretical result $D_{res-t}$. The claimed method makes it possible to detect such a malfunction of the unit 10 without, for example, the failed arithmetic and logic operation having to be executed several times.

Advantages of Securing the Data:

In the claimed method, if an attacker moves a line $LD_j$, an error is then detected with the aid of an error-detecting code. By virtue of this, it is therefore much more difficult to implement an attack in which the code lines are moved without this attack being detected.

Moreover, the claimed method is fast. Indeed, the datum $D_j$ and the error-detecting code associated with this datum $D_D$ are recorded at the same address $@_j$. Consequently, a single reading operation suffices to read at one and the same time the datum and its error-detecting code. Conversely, if these items of information were recorded at different addresses, several reading operations would be required in order to detect an error and this would slow down the execution of the method.

The use of the error-detecting code $EDC_m$ makes it possible to detect an attack which consists in replacing a code line situated at an address $@_j$ with another code line which was previously recorded at the same address $@_j$. Indeed, such a replacement cannot always be detected in the absence of this code $EDC_m$.

The fact of constructing the code $EDC_m$ solely on the basis of the codes $MAC_j$ of the lines $LD_j$ accelerates the calculation of this code $EDC_m$ since the codes $MAC_j$ are generally much shorter than the complete code line. Moreover, this acceleration of the calculation is obtained without modifying the reliability of the error detection since the code $MAC_j$ depends on the datum $D_j$.

The use of an "exclusive OR" to update the code $EDC_m$ allows iterative updating of this code, this being much faster than calculating, whenever a new code line is written, the new code $EDC_m$ on the basis of the content of each of the lines contained in the block $BD_m$.

Using an error-correcting code in the guise of code $ECC_{Dj}$ makes it possible, in addition, to correct a detected error. This therefore makes it possible to continue the execution of the secure function even if an error has been signalled.

Recording the code $EDC_m$ in the memory 29 increases the security of the method since it is very difficult for an attacker to modify this memory.

The fact of coding both the datum $D_j$ and the code $ECC_{Dj}$ by encrypting it with the aid of an encryption function parametrized by the vector $iv_j$ makes it possible to increase the security of the method. Indeed, in addition, the confidentiality of the datum $D_j$ and of the code $ECC_{Dj}$ is ensured.

The fact that a code capable of detecting an error in the cryptogram $CD_j^*$ is used as error-detecting code makes it possible to detect a movement of a code line without even having to decrypt this cryptogram $CD_j^*$.

The invention claimed is:

1. A method of execution of a binary code of a secure function by a microprocessor, the method comprising:

a) recording in a main memory at an address of a code line, the code line containing:
   a datum $D_j$ processable by the microprocessor or a cryptogram of the datum $D_j$, and
   a first error-detecting code permitting detection of an error in the datum $D_j$ or in the cryptogram of the datum $D_j$ when the datum $D_j$ or the cryptogram of the datum $D_j$ is modified after recording in the main memory,
   wherein at least one of the datum $D_j$, the cryptogram of the datum $D_j$, and the first error-detecting code are encrypted as a function of an initialization vector $iv_j$, the initialization vector $iv_j$ varying as a function of an address $@_j$ at which the code line is recorded according to a relation $iv_j=F_{iv}(@_j)$, where function $F_{iv}$ is a preprogrammed function of a securing hardware circuitry of the microprocessor which associates a different initialization vector with each different address of the main memory, b) during execution of the binary code by the microprocessor, the method further comprises:
   1) executing a loading instruction by the microprocessor which causes the loading into registers of the microprocessor the code line recorded at the address $@_j$, and then
   2) calculating, by the securing hardware circuitry, the initialization vector $iv_j$ with aid of relation $iv_j=F_{iv}(@_i)$, where $@_i$ is an address selected on the basis of which the code line has been loaded, and then
   3) decrypting, by the securing hardware circuitry, the code line loaded with aid of the initialization vector $iv_j$ calculated to obtain:
      the datum $D_j$ or the cryptogram of the datum $D_j$, and
      the first error-detecting code, and then
   4) verifying, by the securing hardware circuitry, with aid of the obtained first error-detecting code, whether there exists an error in the datum $D_j$ or the cryptogram of the datum $D_j$ and, when such an error exists, triggering signalling of an execution fault and, when such an error does not exist, inhibiting the signalling of an execution fault, wherein during step a), the method further comprises:
   updating a second error-detecting code as a function of the code line recorded at the address $@_j$, the second error-detecting code permitting detection of an error when any code line, contained in a block of several code lines recorded in a predetermined range of addresses of the main memory, is modified after the updating of the second error-detecting code, the predetermined range of addresses including the address $@_j$, and
   recording the updated second error-detecting code, and
wherein just before or after the operation 1), verifying, using the securing hardware circuitry and with aid of the second error-detecting code updated during step a), whether there exists an error in a data block containing the code line recorded at the address $@_j$, and, when such an error exists, triggering the signalling of an execution fault and, when such an error does not exist, inhibiting the signalling of an execution fault.

2. The method according to claim 1, wherein during step a)
   each code line of the block of several code lines contains, in addition to a datum or cryptogram of the datum, a message authentication code permitting verification of integrity and authenticity of the datum or of the cryptogram contained in a respective code line, and
   the second error-detecting code is updated solely with aid of message authentication code of the code line contained in the respective data block.

3. The method according to claim 2, wherein:
   during the operation a), the second error-detecting code is updated with aid of relation: $EDC_m = EDC_m$ XOR $MAC_{jold}$ XOR $MAC_{jnew}$, where:
   symbols $EDC_m$ on the right and on the left of the symbol "=" are, respectively, the preceding value and the updated value of the second error-detecting code,
   symbol XOR is the "exclusive OR" operation, and
   symbols $MAC_{jold}$ and $M_{jnew}$ are values of the message authentication codes, respectively, of old and new code lines recorded at the address $@_j$.

4. The method according to claim 1, wherein the updated second error-detecting code is recorded in a secure memory of the securing hardware circuitry, the secure memory being only accessible by the securing hardware circuitry.

5. The method according to claim 1, wherein:
   during step a), the first error-detecting code is an error-correcting code which permits correction of an error in the datum $D_j$ or in the cryptogram of datum $D_j$,
   during the operation 4), when an error exists, the securing hardware circuitry corrects the datum $D_j$ or the cryptogram of datum $D_j$ with aid of the error-correcting code and then, the microprocessor processes the corrected datum $D_j$ or the corrected cryptogram of datum $D_j$.

6. The method according to claim 1, wherein during step a):
   the code line contains a cryptogram $CD_j^*$ of a concatenation $CD_j$ of the datum $D_j$ and of the first error-detecting code, the cryptogram $CD_j^*$ being obtained with aid of a relation $CD_j^* = f_{ka}(CD_j; iv_j)$, where the function $f_{ka}$ is a predetermined encryption function corresponding to a decryption function $f_{ka}^{-1}$ preprogrammed into the securing hardware circuitry, the cryptogram $CD_j^*$ thus coding the datum $D_j$ and the first error-detecting code as a function of the initialization vector $iv_j$,
   during the operation 3), the decryption of the code line by the securing hardware circuitry comprises the decryption of the cryptogram $CD_j^*$ with aid of relation $CD_j = f_{ka}^{-1}(CD_j^*; iv_j)$ to obtain the decrypted datum $D_j$ and the decrypted first error-detecting code.

7. The method according to claim 1, wherein:
   during step a), the code line contains a cryptogram $CD_j^*$ constructed on the basis of the datum $D_j$ and the first error-detecting code permits detection of an error in the cryptogram $CD_j^*$, the first error-detecting code or the cryptogram $CD_j^*$ being encrypted function of the initialization vector $iv_j$,
   during the operation 3), the decryption of the code line by the securing hardware circuitry comprises the decryption, with aid of the calculated initialization vector $iv_j$, of the cryptogram $CD_j^*$ or of the first error-detecting code encrypted as a function of the initialization vector $iv_j$.

8. The method according to claim 1, wherein the first error-detecting code is a BCH code.

9. The method according to claim 1, wherein the verifying further comprises comparing the obtained first error-detecting code and a calculated error-detecting code.

10. The method according to claim 1, wherein each code line corresponds to a machine word which can be transferred in a single clock cycle from the main memory into a register of the microprocessor.

11. The method according to claim 1, wherein the preprogrammed function is a hash function.

12. A non-transitory computer readable medium storing a binary code of a secure function executable by a microprocessor to cause the microprocessor to perform a method, wherein the method comprises:
   a) recording in a main memory at an address of a code line, the code line containing:
      a datum $D_j$ processable by the microprocessor or a cryptogram of the datum $D_j$, and
      a first error-detecting code permitting detection of an error in the datum $D_j$ or in the cryptogram of the datum $D_j$ when the datum $D_j$ or the cryptogram of the datum $D_j$ is modified after recording in the main memory,
      wherein at least one of the datum $D_j$, the cryptogram of the datum $D_j$, and the first error-detecting code are encrypted as a function of an initialization vector $iv_j$, the initialization vector $iv_j$ varying as a function of an address $@_j$ at which the code line is recorded according to a relation $iv_j=F_{jv}(@_j)$, where function $F_{jv}$ is a preprogrammed function of a securing hardware circuitry of the microprocessor which associates a different initialization vector with each different address of the main memory,
   b) during execution of the binary code by the microprocessor, the method further comprises:
      1) executing a loading instruction by the microprocessor which causes the loading into registers of the microprocessor the code line recorded at the address $@_j$, and then
      2) calculating, by the securing hardware circuitry, the initialization vector $iv_j$ with aid of relation $iv_j=F_{jv}(@_j)$, where $@_j$ is an address selected on the basis of which the code line has been loaded, and then
      3) decrypting, by the securing hardware circuitry, the code line loaded with aid of the initialization vector $iv_j$ calculated to obtain:
         the datum $D_j$ or the cryptogram of the datum Dj, and
         the first error-detecting code, and then
      4) verifying, by the securing hardware circuitry, with aid of the obtained first error-detecting code, whether there exists an error in the datum $D_j$ or the cryptogram of the datum $D_j$ and, when such an error exists, triggering signalling of an execution fault and, when such an error does not exist, inhibiting the signalling of an execution fault,
   wherein during step a), the method further comprises:
      updating a second error-detecting code as a function of the code line recorded at the address $@_j$, the second error-detecting code permitting detection of an error when any code line, contained in a block of several code lines recorded in a predetermined range of addresses of the main memory, is modified after the updating of the second error-detecting code, the predetermined range of addresses including the address $@_j$, and
      recording the updated second error-detecting code, and
   wherein just before or after the operation 1), verifying, using the securing hardware circuitry and with aid of the second error-detecting code updated during step a), whether there exists an error in a data block containing the code line recorded at the address $@_j$, and, when such an error exists, triggering the signalling of an execution fault and, when such an error does not exist, inhibiting the signalling of an execution fault.

13. A microprocessor comprising:
   a securing hardware circuitry; and
   an arithmetic and logic circuit configured to:
   a) record in a main memory at an address of a code line, the code line containing:
      a datum $D_j$ processable by the microprocessor or a cryptogram of the datum $D_j$, and
      a first error-detecting code permitting detection of an error in the datum $D_j$ or in the cryptogram of the datum $D_j$ when the datum $D_j$ or the cryptogram of the datum $D_j$ is modified after recording in the main memory,
      wherein at least one of the datum $D_j$, the cryptogram of the datum $D_j$, and the first error-detecting code are encrypted as a function of an initialization vector the initialization vector varying as a function of an address $@_j$ at which the code line is recorded according to a relation $iv_j=F_{jv}(@_j)$, where function $F_{jv}$ is a preprogrammed function of the securing hardware circuitry which associates a different initialization vector with each different address of the main memory,
   b) during execution of the binary code, the arithmetic and logic circuit is further configured to:
      1) execute a loading instruction which causes the loading into registers of the microprocessor of the code line recorded at the address $@_j$, and then
      2) calculate, by the securing hardware circuitry, the initialization vector $iv_j$ with aid of relation $iv_y=F_{jv}(@_j)$, where $@_j$ is an address selected on the basis of which the code line has been loaded, and then
      3) decrypt, by the securing hardware circuitry, the code line loaded with aid of the initialization vector $iv_j$ calculated to obtain:
         the datum $D_j$ or the cryptogram of the datum $D_j$, and
         the first error-detecting code, and then
      4) verify, by the securing hardware circuitry, with aid of the obtained first error-detecting code, whether there exists an error in the datum $D_j$ or the cryptogram of the datum $D_j$ and, when such an error exists, triggering signalling of an execution fault and, when such an error does not exist, inhibiting the signalling of an execution fault,
   wherein during a), the arithmetic and logic circuit is further configured to:
      update a second error-detecting code as a function of the code line recorded at the address $@_j$, the second error-detecting code permitting detection of an error when any code line, contained in a block of several code lines recorded in a predetermined range of addresses of the main memory, is modified after the updating of the second error-detecting code, the predetermined range of addresses including the address $@_j$, and
      record the updated second error-detecting code, and
   wherein just before or after 1), the arithmetic and logic circuit is further configured to:
   verify, using the securing hardware circuitry and with aid of the second error-detecting code updated during a), whether there exists an error in a data block containing the code line recorded at the address $@_j$, and, when such an error exists, trigger the signalling of an execution fault and, when such an error does not exist, inhibit the signalling of an execution fault.

14. A compiler for automatically transforming a source code of a secure function into a binary code of the secure function, wherein the compiler comprises:

a first microprocessor; and
a memory,
wherein the first microprocessor is configured to transform the source code into a binary code of the secure function that causes a second microprocessor to perform a method, wherein the method comprises:
a) recording in a main memory at an address of a code line, the code line containing:
   a datum $D_j$ processable by the second microprocessor or a cryptogram of the datum $D_j$, and
   a first error-detecting code permitting detection of an error in the datum $D_j$ or in the cryptogram of the datum $D_j$ when the datum $D_j$ or the cryptogram of the datum $D_j$ is modified after recording in the main memory,
   wherein at least one of the datum $D_j$, the cryptogram of the datum $D_j$, and the first error-detecting code are encrypted as a function of an initialization vector $iv_j$, the initialization vector $iv_j$ varying as a function of an address $@_j$ at which the code line is recorded according to a relation $iv_j = F_{iv}(@_j)$, where function $F_{iv}$ is a preprogrammed function of a securing hardware circuitry of the second microprocessor which associates a different initialization vector with each different address of the main memory,
b) during execution of the binary code by the second microprocessor, the method further comprises:
   1) executing a loading instruction by the second microprocessor which causes the loading into registers of the second microprocessor the code line recorded at the address $@_j$, and then
   2) calculating, by the securing hardware circuitry, the initialization vector $iv_j$ with aid of relation $iv_j = F_{iv}$ ($@_j$), where $@_j$ is an address selected on the basis of which the code line has been loaded, and then
   3) decrypting, by the securing hardware circuitry, the code line loaded with aid of the initialization vector $iv_j$ calculated to obtain:
      the datum $D_j$ or the cryptogram of the datum Dj, and
      the first error-detecting code, and then
   4) verifying, by the securing hardware circuitry, with aid of the obtained first error-detecting code, whether there exists an error in the datum $D_j$ or the cryptogram of the datum $D_j$ and, when such an error exists, triggering signalling of an execution fault and, when such an error does not exist, inhibiting the signalling of an execution fault,
wherein during step a), the method further comprises:
   updating a second error-detecting code as a function of the code line recorded at the address $@_j$, the second error-detecting code permitting detection of an error when any code line, contained in a block of several code lines recorded in a predetermined range of addresses of the main memory, is modified after the updating of the second error-detecting code, the predetermined range of addresses including the address $@_j$, and
   recording the updated second error-detecting code, and
wherein just before or after the operation 1), verifying, using the securing hardware circuitry and with aid of the second error-detecting code updated during step a), whether there exists an error in a data block containing the code line recorded at the address $@_j$, and, when such an error exists, triggering the signalling of an execution fault and, when such an error does not exist, inhibiting the signalling of an execution fault.

\* \* \* \* \*